US009122428B2

(12) United States Patent
Aritomi

(10) Patent No.: US 9,122,428 B2
(45) Date of Patent: Sep. 1, 2015

(54) INFORMATION PROCESSING APPARATUS ALLOWING A USER CERTAIN PRINT SETTING OPERATIONS IN AN ENVIRONMENT WHERE AN IMAGE PROCESSING APPARATUS IS UNDETERMINED

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 13/290,465

(22) Filed: Nov. 7, 2011

(65) Prior Publication Data

US 2012/0120443 A1 May 17, 2012

(30) Foreign Application Priority Data

Nov. 17, 2010 (JP) ................................. 2010-257213
Jul. 1, 2011 (JP) ................................. 2011-147414

(51) Int. Cl.
*G06F 3/12* (2006.01)
(52) U.S. Cl.
CPC ............ *G06F 3/1205* (2013.01); *G06F 3/1253* (2013.01); *G06F 3/1287* (2013.01); *G06F 3/1225* (2013.01)
(58) Field of Classification Search
None
See application file for complete search history.

(56) References Cited

U.S. PATENT DOCUMENTS

| 2003/0112456 | A1* | 6/2003 | Tomita et al. | 358/1.13 |
| 2006/0170947 | A1* | 8/2006 | Kurabayashi | 358/1.13 |
| 2006/0291005 | A1* | 12/2006 | Genda | 358/474 |
| 2008/0074694 | A1* | 3/2008 | Saida | 358/1.15 |
| 2008/0222181 | A1* | 9/2008 | Yoshioka | 707/101 |
| 2008/0297839 | A1* | 12/2008 | Kayama et al. | 358/1.15 |
| 2009/0128849 | A1* | 5/2009 | Sakura | 358/1.15 |
| 2009/0180140 | A1* | 7/2009 | Kawamura | 358/1.15 |
| 2009/0237724 | A1* | 9/2009 | Furuya | 358/1.15 |
| 2010/0058360 | A1* | 3/2010 | Asai | 719/321 |

FOREIGN PATENT DOCUMENTS

| JP | 2007-015370 A | 1/2007 |
| JP | 2007-034846 A | 2/2007 |
| JP | 3880575 | 2/2007 |
| JP | 2007-280269 A | 10/2007 |
| JP | 2010-250532 A | 11/2010 |

* cited by examiner

*Primary Examiner* — Hilina K Demeter
(74) *Attorney, Agent, or Firm* — Canon U.S.A., Inc. IP Division

(57) ABSTRACT

A common setting screen through which a common setting that does not depend on an image processing apparatus model can be set, and an individual setting screen through which an individual setting that depends on an image processing apparatus model can be set, are controlled so as to be displayed on a print setting screen.

14 Claims, 34 Drawing Sheets

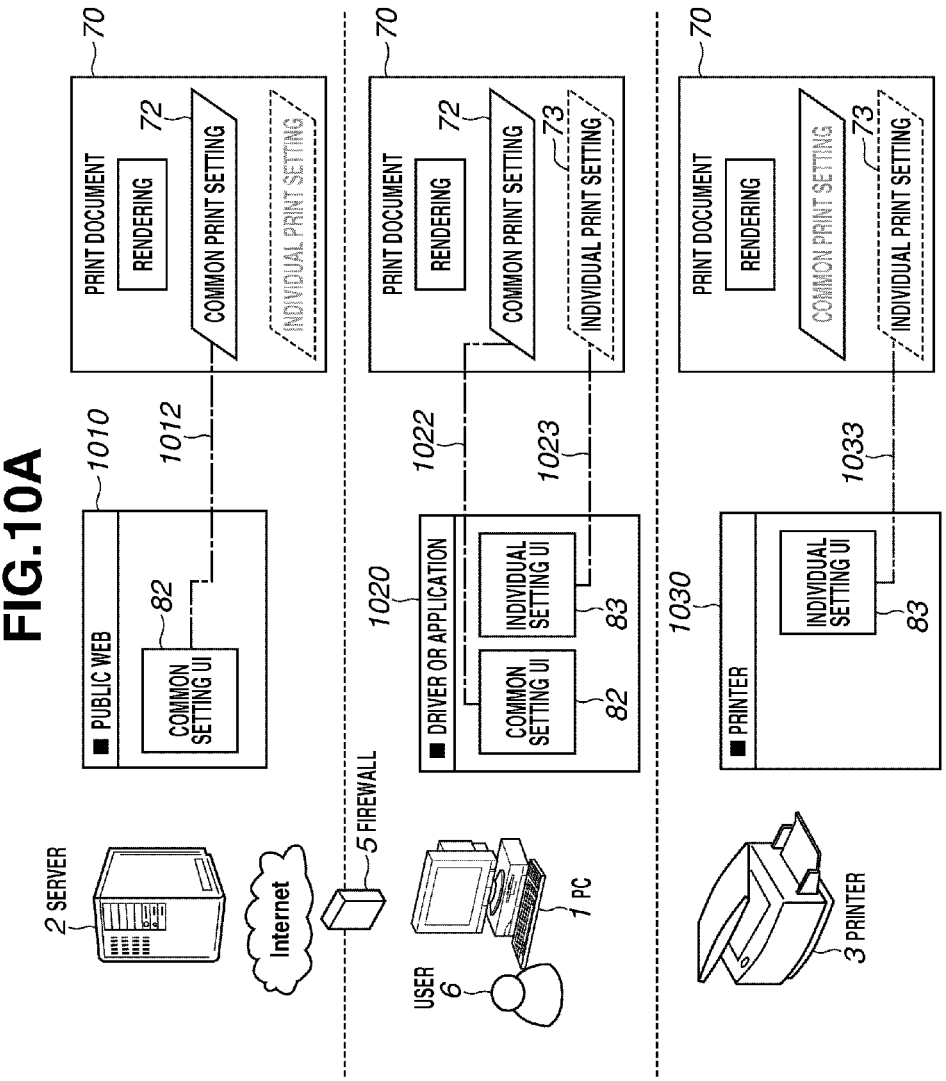

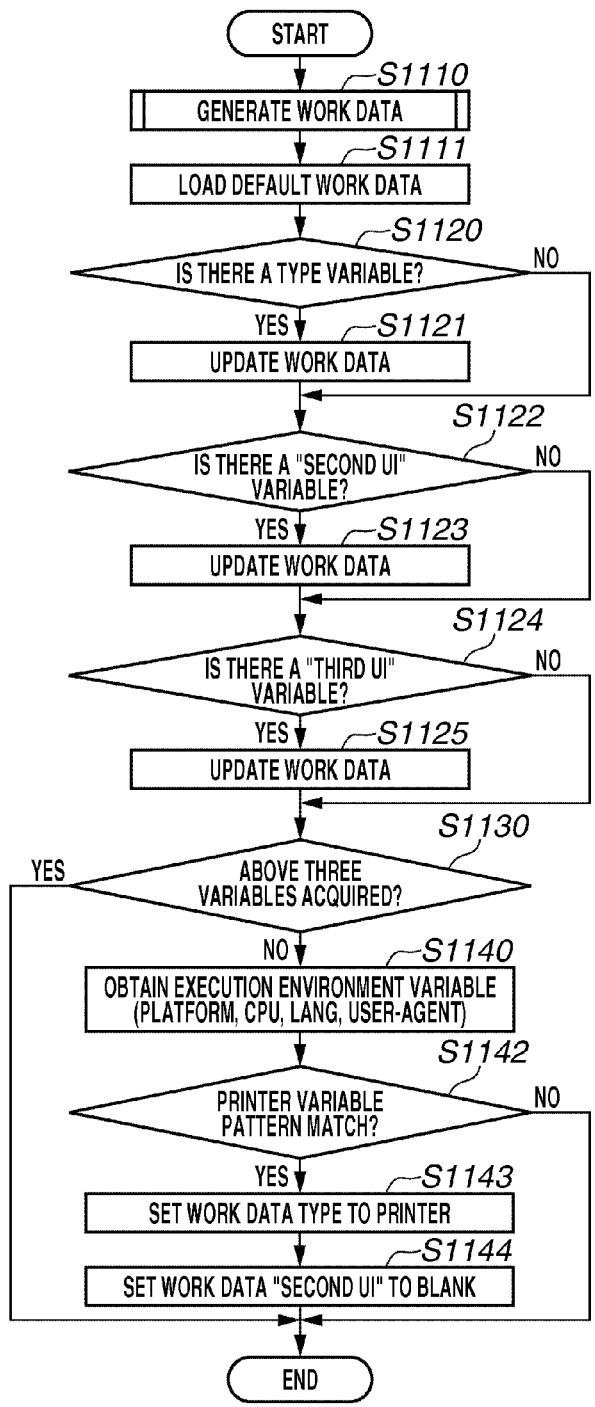

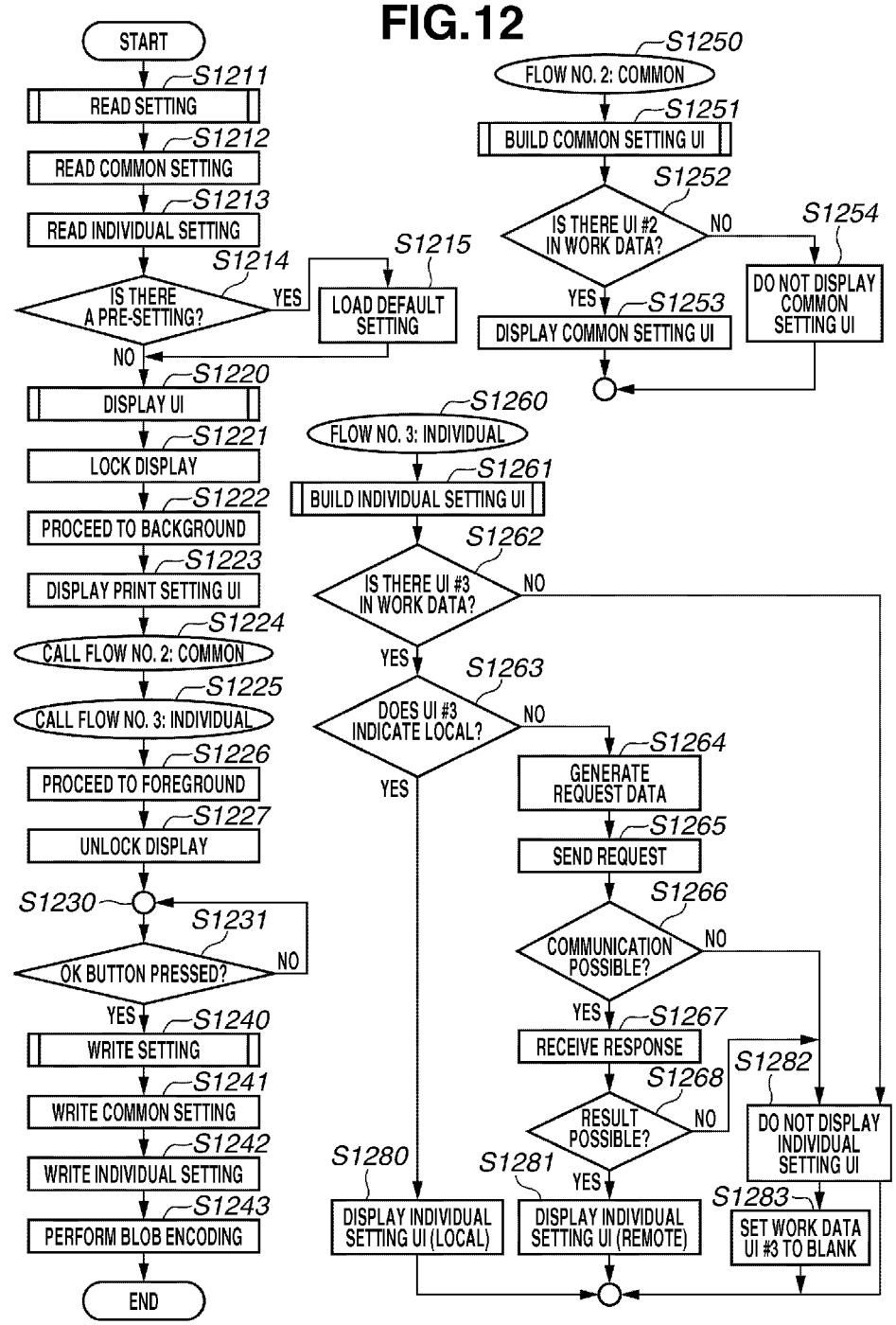

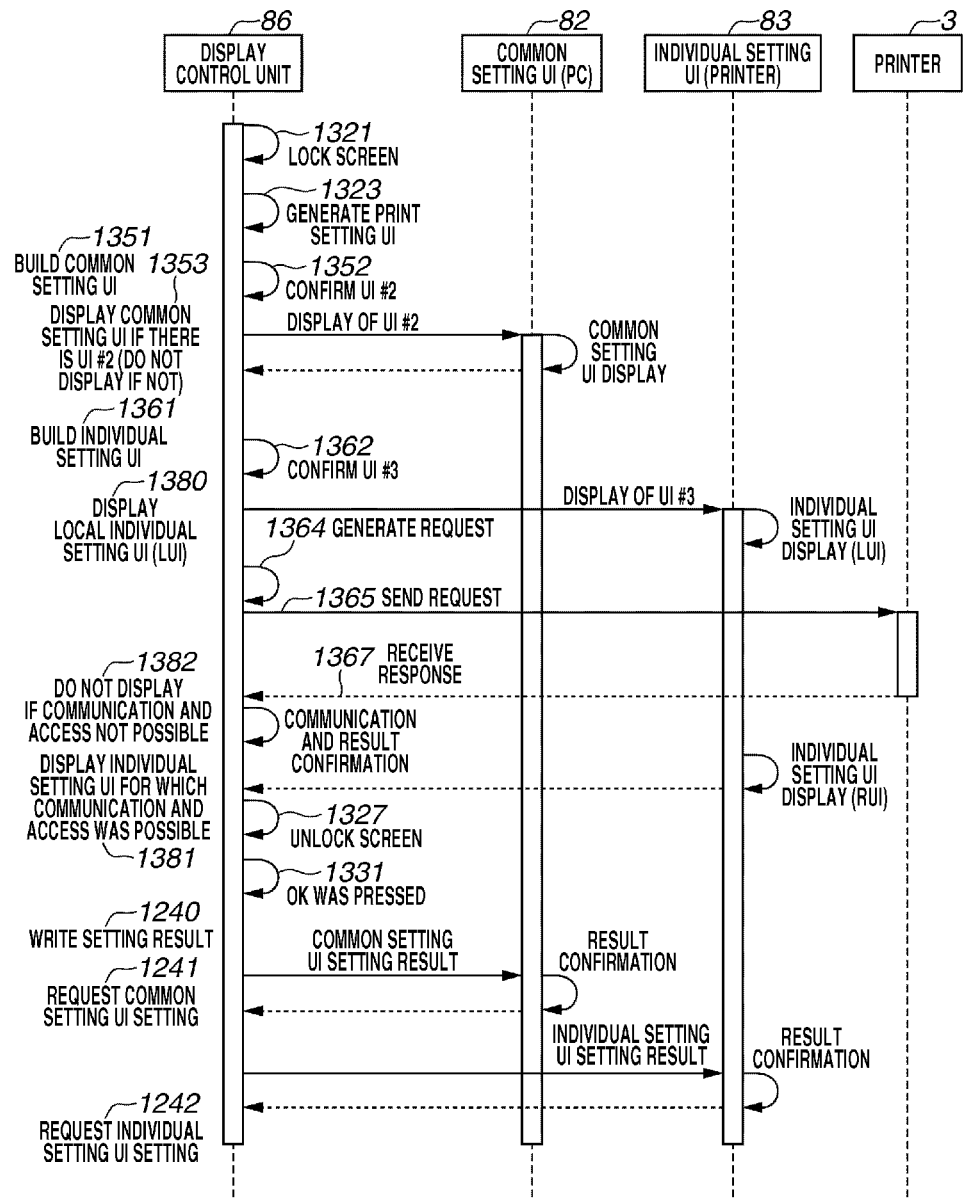

FIG.22A
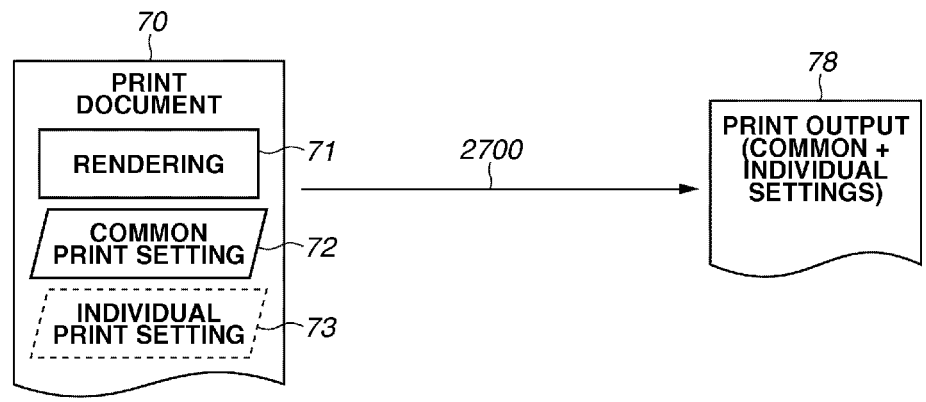
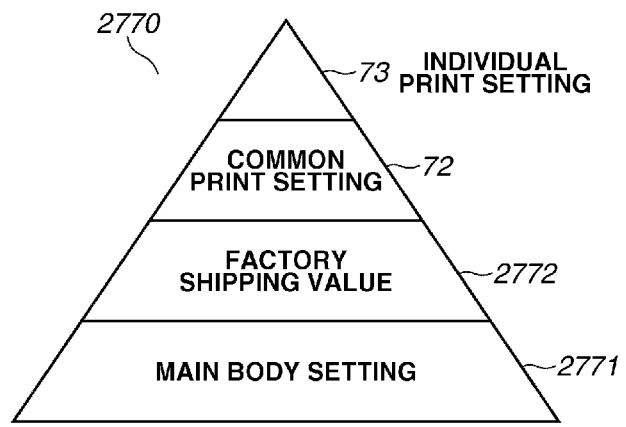

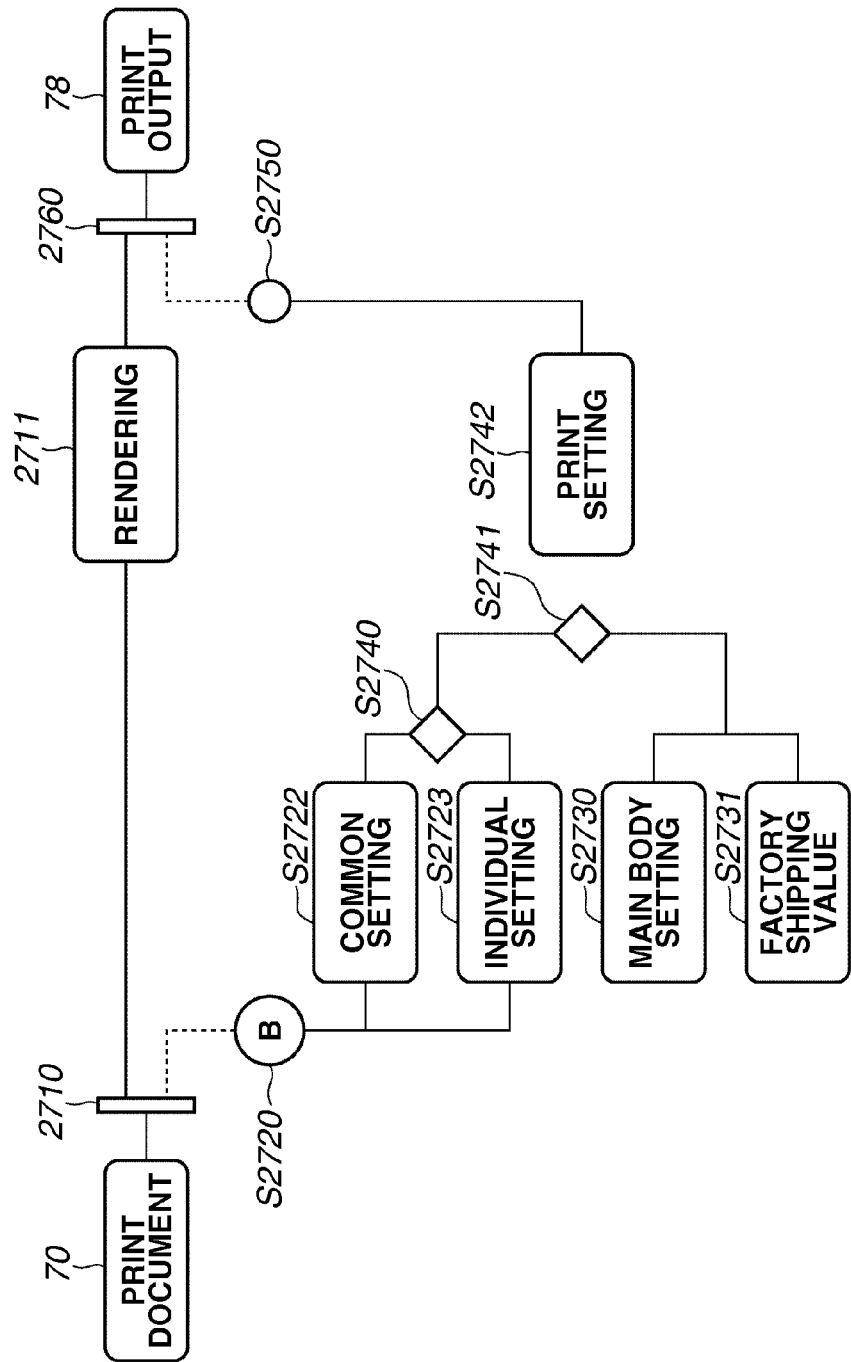

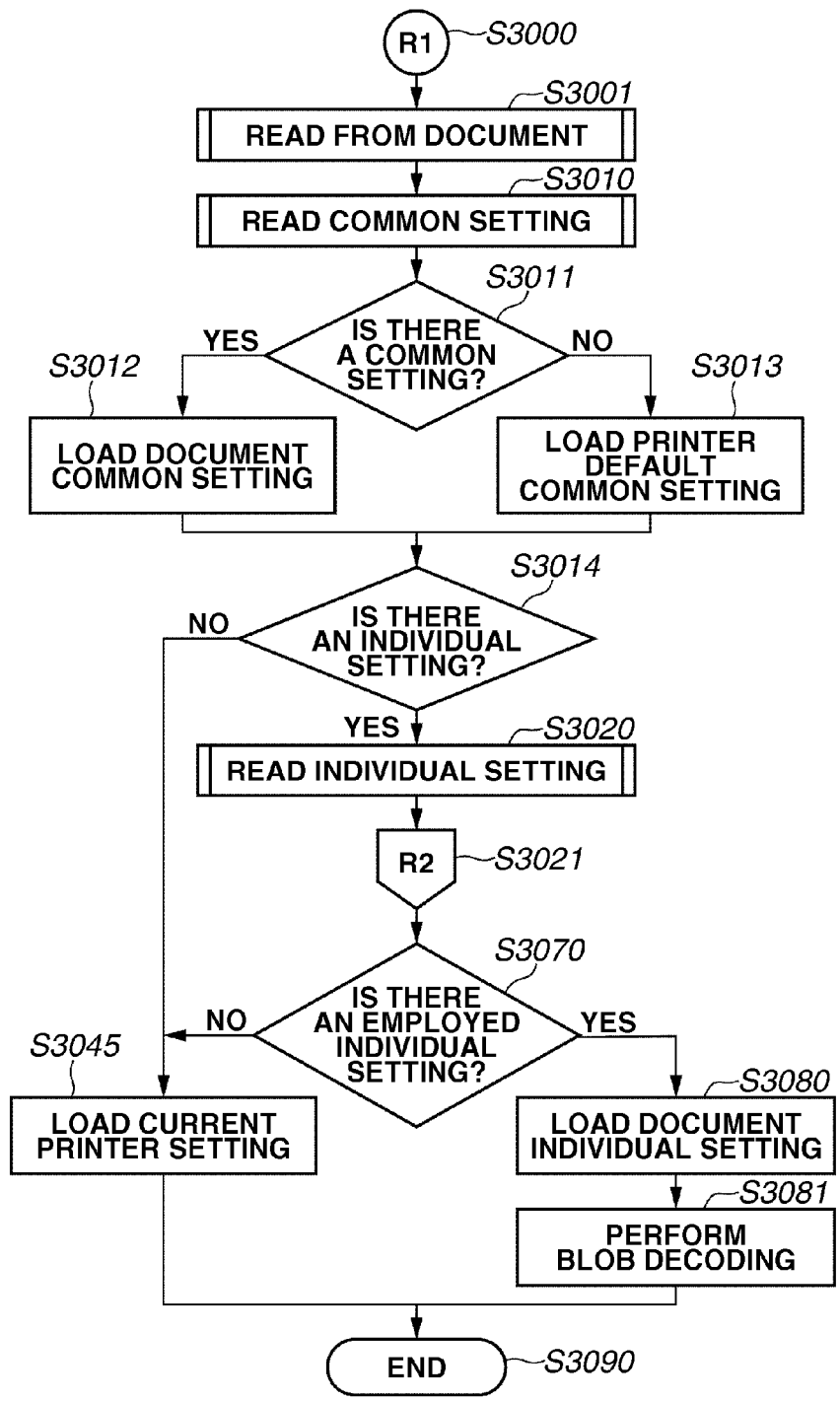

FIG.28A
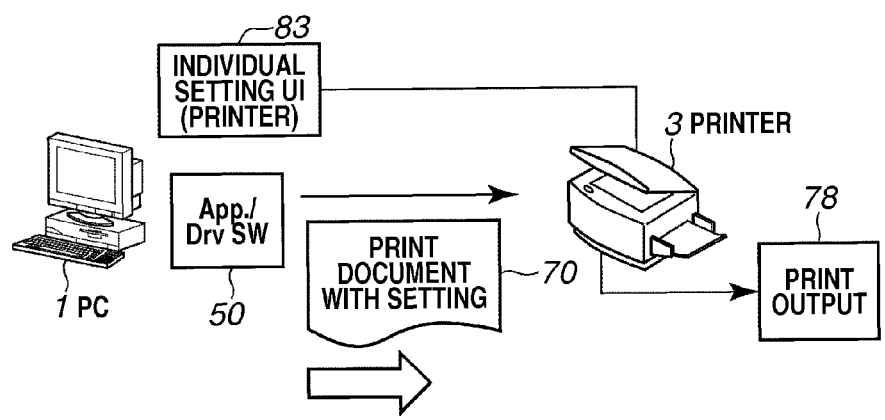
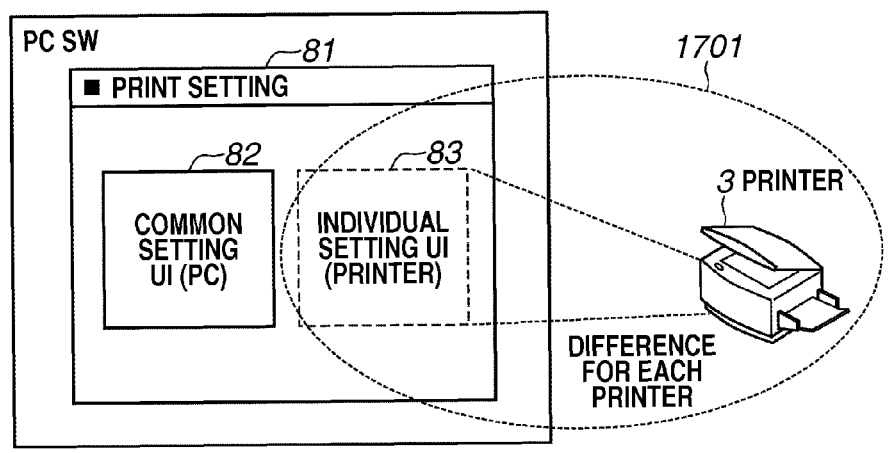

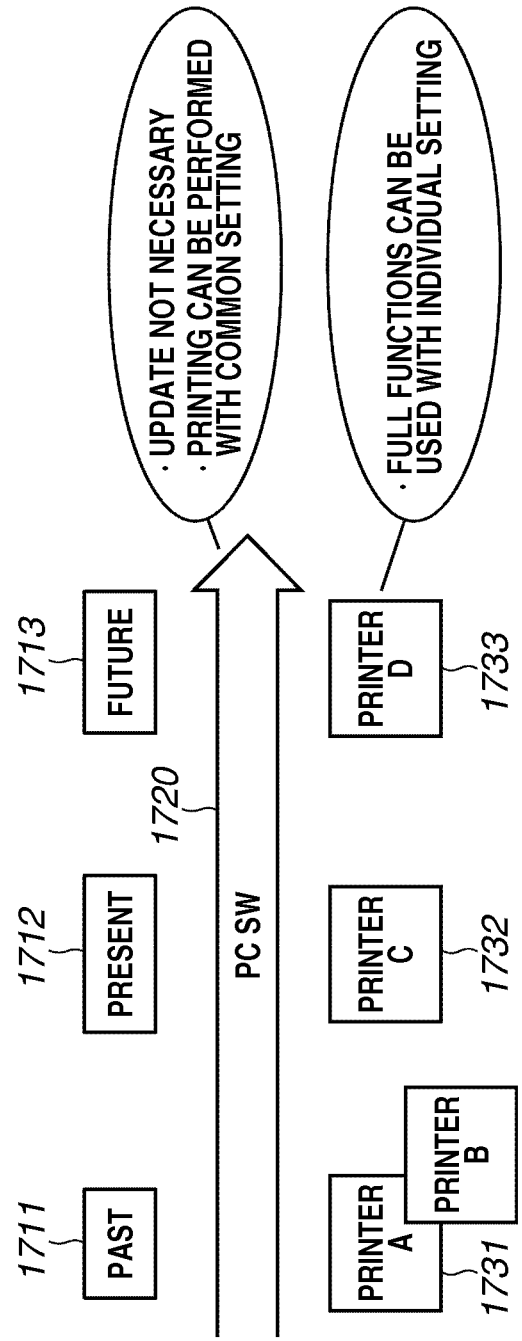

INFORMATION PROCESSING APPARATUS ALLOWING A USER CERTAIN PRINT SETTING OPERATIONS IN AN ENVIRONMENT WHERE AN IMAGE PROCESSING APPARATUS IS UNDETERMINED

BACKGROUND OF THE INVENTION

1. Field of the Invention

The present invention relates to an information processing apparatus, an information processing system, and a storage medium.

2. Description of the Related Art

To print business documents in the workplace, typically a user outputs data from a Windows® PC that is on a local area network to a printer. The user sets a print setting by operating a setting UI in a printer driver supporting the printer.

Japanese Patent No. 3880575 discusses a print setting UI technology. The setting UI is controlled by a virtual printer driver arranged in a server. A basic setting UI is selected for a virtual printer driver if printers from other companies are included in a plurality of lower-level real printer drivers.

However, currently, the workplace environment for users is starting to shift from an office LAN to a wide area network (WAN). Further, the user environment is also changing due to the spread of non-Windows mobile terminals and web services. In view of this situation, attention is starting to focus on business document printing in a WAN environment, such as mobile printing and Internet printing services.

When performing a print setting operation in a WAN environment, there is the problem that it is difficult to set an appropriate print setting based on the printing situation.

For example, on the server on the WAN side, the printer on the LAN side blocked by a firewall will be undetermined. Therefore, on the WAN server, it is difficult to set a print setting that is appropriate for the output printer.

Even in an environment in which the printer is undetermined, it is still necessary to provide the user with a certain level of print setting operations. Further, users want to fully utilize the functions of the actual output printer.

SUMMARY OF THE INVENTION

The present invention is directed to a technique capable of providing users with a certain level of print setting operations even in an environment in which an image processing apparatus is undetermined, and when the image processing apparatus is confirmed, allowing the users to fully utilize the functions of the image processing apparatus.

According to an aspect of the present invention, an information processing apparatus includes a display control unit configured to control so that a common setting screen that can set a common setting which does not depend on an image processing apparatus model and an individual setting screen that can set an individual setting which depends on an image processing apparatus model are displayed on a print setting screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10A illustrates an example in which the print setting is sequentially set while a print document moves between different environments.

FIG. 11 is a flowchart illustrating formation of the work data by a control unit.

FIG. 12 is a flowchart illustrating generation of a print setting UI by the control unit.

FIG. 13 is a PC and printer sequence diagram of the print setting UI.

FIG. 22A illustrates a hierarchy example of setting data during printing by the printer.

FIG. 22B is a chart illustrating building of setting data during printing by the printer 3.

FIG. 24 is a flowchart illustrating reading of the individual print setting by the printer control unit.

FIG. 28A illustrates a product configuration to which the present exemplary embodiment can be easily applied.

FIG. 28B illustrates a device support life cycle of the present system.

DESCRIPTION OF THE EMBODIMENTS

Various exemplary embodiments, features, and aspects of the invention will be described in detail below with reference to the drawings.

Figure 1:
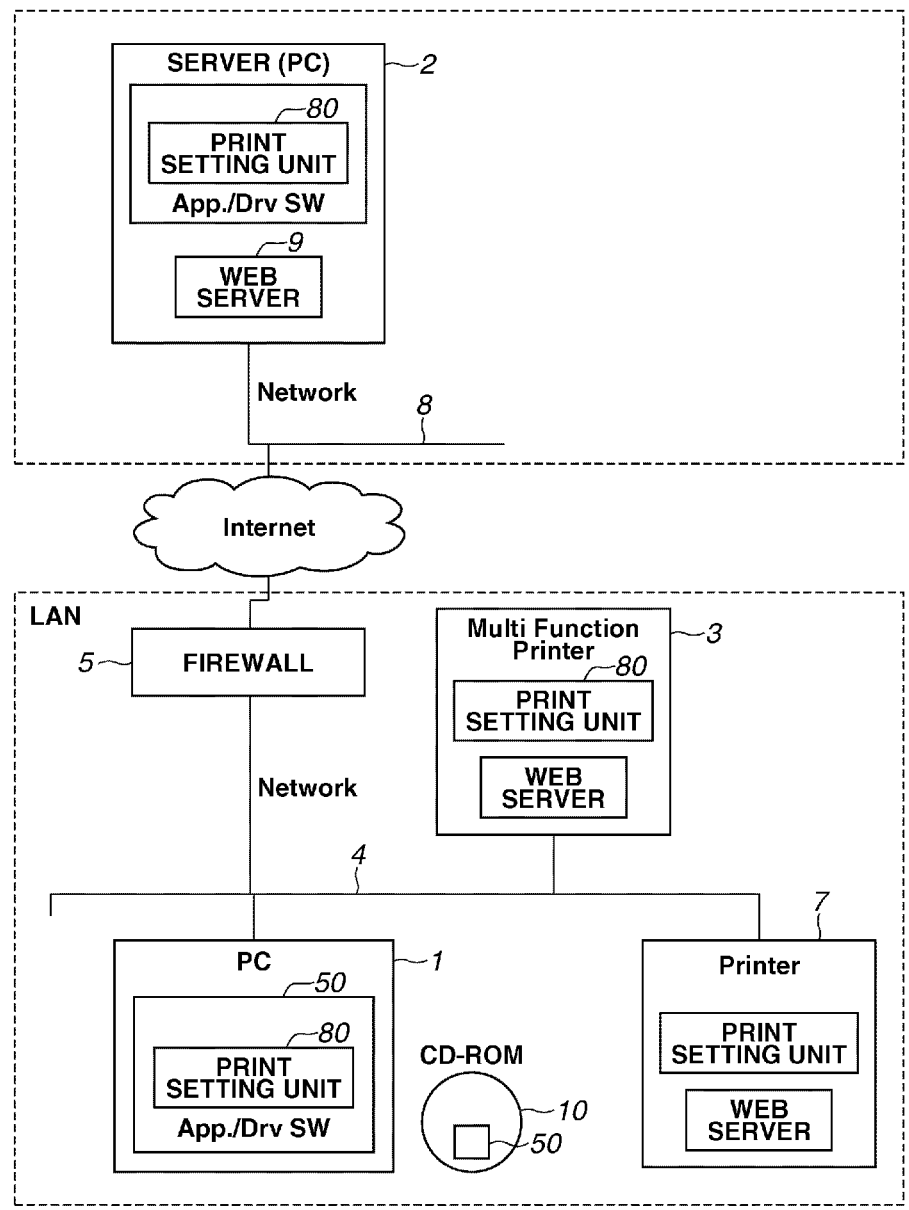
FIG. 1 is a block diagram illustrating a configuration of a system according to an exemplary embodiment.

FIG. 1 is a block diagram illustrating a configuration of a system according to an exemplary embodiment. In FIG. 1, a PC 1 and a server 2 are configured from hardware such as that described below referring to FIG. 2A. Windows or an equivalent operating system (OS) is installed as an OS in the PC 1 and the server 2.

The PC 1 and the server 2 are connected to a network 4 and 8, which are respectively configured by Ethernet®. A printer 3 is configured from a color printer, a color facsimile, a color scanner, and the like.

Some other device may be used instead of the printer 3, such as a printer, a copying machine, a facsimile machine, a scanner, or a digital camera. The printer 3 may sometimes be referred to below as "MFP 3" or "printer 3". The MFP 3 is configured from hardware such as that described below referring to FIG. 2B. The MFP 3 is connected to the PC 1 via the network 4, which allows the MFP 3 and the PC 1 to communicate with each other in either direction.

A print setting unit 80 is arranged in the PC 1, the server 2, and the printer 3, for example. In the case of the PC, an application 50, which is an executable file (*.exe) or a printer driver software 50, which is a library format file (*.dll), uses the print setting unit 80. In the drawings, this unit is denoted as "App./Dry SW 50".

The network 4 is a company network built at the office of the user (client) using the printer 3. The printer 3 is a shared-use MFP that is connected to the PC 1 via the network 4 in this office. The network 8 is a network built at a web service center.

The server 2 connected to the network 8 includes a web server 9 that has a web server function. The server 2 provides a web site via the Internet. A compact disc read-only memory (CD-ROM) 10 that can be inserted into the PC 1 stores software and electronic files. The print setting unit 80 and the application or printer driver software 50 are distributed from the web server 9 and the CD-ROM 10. A printer 7 is a different device from the printer 3.

Figure 2A:
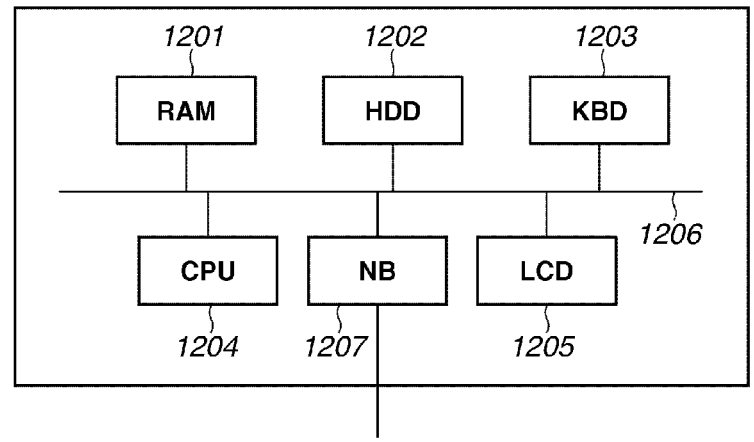
FIG. 2A is a block diagram illustrating an example of a PC hardware configuration.
Figure 2B:
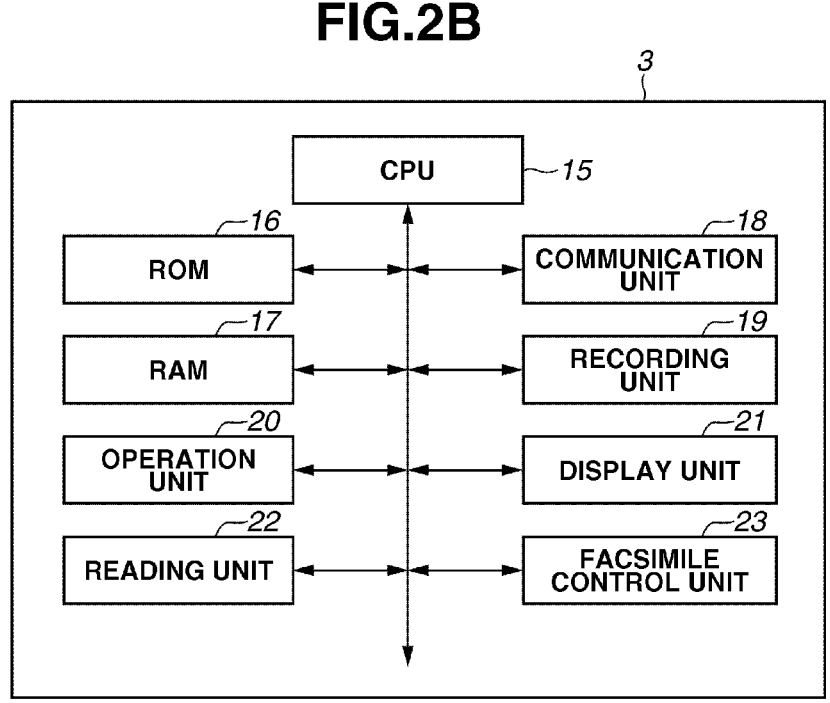
FIG. 2B is a block diagram illustrating an example of an MFP hardware configuration.

FIGS. 2A and 2B are block diagrams illustrating an example of the PC and the printer hardware configuration. FIG. 2A is a block diagram illustrating an example of the PC hardware configuration.

The PC 1 and the server 2 are configured from hardware like that illustrated in FIG. 2A. FIG. 2A will be described using the PC 1 as an example. As illustrated in FIG. 2A, the PC 1 includes a random access memory unit (RAM 1201), a hard disk drive unit (HDD 1202), which is a storage unit, a keyboard unit (KBD 1203), which is an example of an input unit, and a central processing unit (CPU) 1204 as a control unit.

In addition, the PC 1 includes a display (liquid crystal display (LCD) 1205), a network board (NB 1207), and a bus 1206 for connecting these constituent elements in the PC 1 to each other. The LCD 1205 is an example of a display unit, and the NB 1207 is an example of a communication control unit. The storage unit may also be, for example, a portable CD-ROM or an internally mounted ROM.

The applications such as the print setting unit 80 and the programs in the respective modules (software) are stored in the HDD 1202. These applications and programs are read into the RAM 1201 as necessary, and executed by the CPU 1204. Consequently, the CPU 1204 realizes the functions of the applications such as the print setting unit 80, and the respective modules (software).

FIG. 2B is a block diagram illustrating an example of an MFP hardware configuration.

The MFP 3 has a hardware configuration like that illustrated in FIG. 2B. As a central processing unit of the MFP 3, a CPU 15 controls a RAM 17, a communication unit 18, a recording unit 19, an operation unit 20, a display unit 21, a reading unit 22, and a facsimile control unit 23 based on programs stored in a ROM 16. The ROM 16 stores programs executed by the MFP 3 for recording (printing) based on a control from the CPU 15 and for transmitting a state to the PC 1.

The RAM 17 mainly stores print data temporarily sent from the PC 1 that is to be printed by the recording unit 19. Further, the RAM 17 also temporarily stores image data read by the reading unit 22 and print job data received from the PC 1.

The communication unit 18 includes a connection port for the network 4, and controls Ethernet and print job communication. The recording unit 19 is configured from a recording section and an electric circuit. The recording section is configured from, for example, an electrophotographic laser unit, a drum, respective color toners, and a recording paper conveyance mechanism. The electric circuit is configured from, for example, an application-specific integrated circuit (ASIC). Based on the print operation from the printable application, the print job is temporarily stored in the HDD 1202 of the PC 1.

Print jobs that have been converted into print data which includes a control command are sent to the MFP 3 via the network 4. The print data received by the MFP 3 is printed on recording paper by the recording unit 19.

The operation unit 20 is configured from various buttons, such as a power button and a reset button. The operation unit 20 can operate the MFP 3. The display unit 21 is configured from a touch panel liquid crystal display. The display unit 21 can, for example, display the state of the MFP 3, be used to set various settings, display the settings, and receive inputs.

The reading unit 22 is configured from a color image sensor and an electric circuit, which is configured from, for example, an image processing ASIC. The facsimile control unit 23 is configured from a facsimile modem and a communication circuit, for example. The facsimile control unit 23 controls the sending and receiving of facsimiles based on a facsimile communication protocol.

The functions of the MFP 3 are realized by the CPU 15 reading programs stored in the ROM 16 into the RAM 17 as necessary, and executing the programs.

Figure 3:
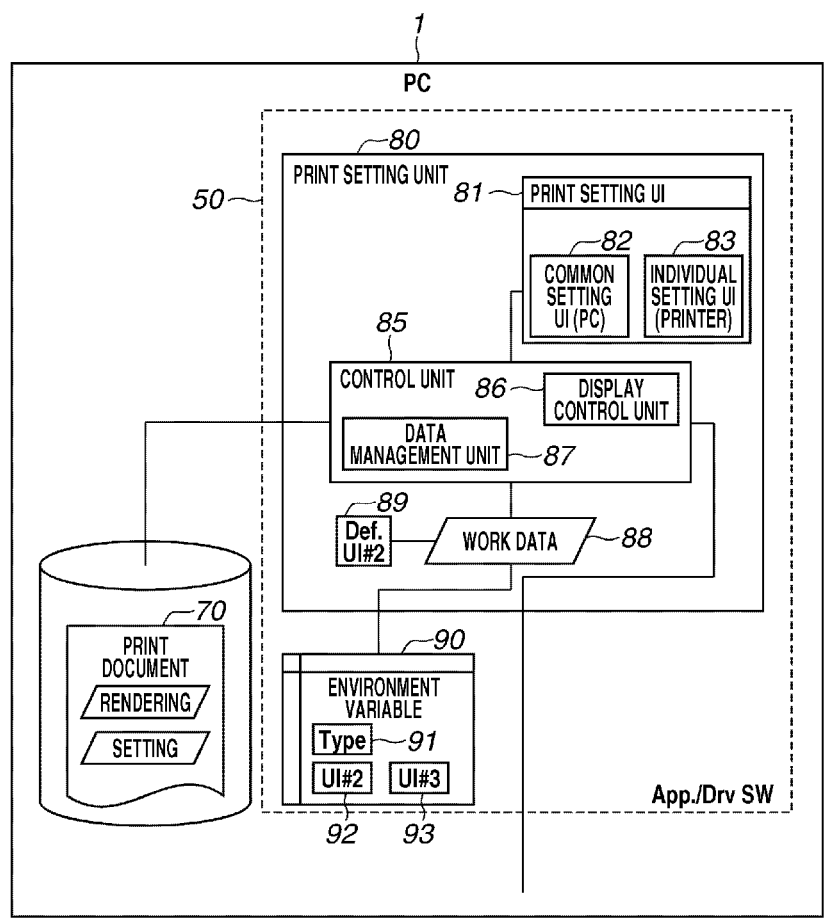
FIG. 3 is a block diagram illustrating an example of a PC software configuration.

FIG. 3 is a block diagram illustrating an example of a PC software configuration.

This configuration will be described using the PC 1 as an example. The application or printer driver software 50 is loaded in order to use or control the printer 3. A print document 70 is a file that is spooled during printing by the printer 3. The print document 70 includes print rendering and setting information.

The print setting unit 80 is configured from a print setting user interface (UI) 81, a control unit 85, and work data 88. The control unit 85 controls the execution of the print setting unit 80. The control unit 85 has modules of a display control unit 86 for displaying a UI setting and a data management unit 87 for managing print setting data.

The print setting UI 81 is operated during print setting by the user. Execution of the print setting UI 81 is controlled by the display control unit 86 in the control unit 85. The print setting UI 81 includes a common setting UI 82 and an individual setting UI 83. How the display control unit 86 controls the common setting UI 82 and the individual setting UI 83 to display the print settings, and how the display control unit 86 manages the print setting data will be described below.

The print setting UI is an example of a print setting screen or a setting screen. The common setting UI is an example of a common setting screen that can set common settings that do not depend on the model of the printer 3, or a common print setting screen on the PC 1 or server 2 side.

The individual setting UI is an example of an individual setting screen that can set individual settings that depend on the model of the printer 3, or an individual print setting screen on the printer 3 side. Further, the PC 1, the server 2, and the printer 3 are examples of information processing apparatuses.

The work data 88 is generated and referred to during execution by the control unit 85. A default common setting UI 89 (Def. UI #2) 89 is linked to the work data 88, and is loaded and utilized in the common setting UI 82 as necessary. An environment variable 90 is referred to during generation of the work data 88. The environment variable 90 is a variable that is provided to the print setting unit 80.

The environment variable 90 includes a type 91, a UI #2 92, and a UI #3 93. The type 91 is a variable that describes the type of execution environment. The UI #2 92 and the UI #3 93 are data indicating the common setting UI 82 or the individual setting UI 83 to be used. What kind of data the work data 88 is will be described below.

The print setting unit 80 is stored on a flexible disk (FD), a CD-ROM, or a medium via the NB 1207 network, similar to the HDD 1202, and can be added to or updated as a file. The print setting unit 80 is a program module that is loaded in the RAM 1201 by the OS or the module using that module, and interpreted and executed by the CPU 1204.

Further, the environment variable 90 is also stored on a FD, a CD-ROM, or a medium via the NB 1207 network, similar to the HDD 1202, and can be added to or updated as a file. The block diagram illustrating an example of the software configuration of the PC 1 has been described. Next, a diagram illustrating a representative operation example of the present system will be described.

Figure 4:
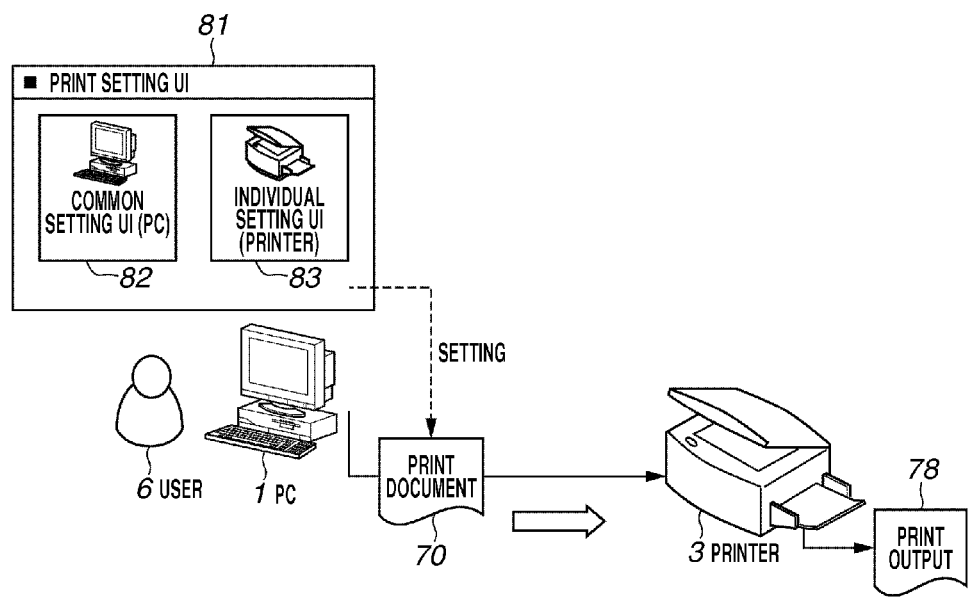
FIG. 4 illustrates a representative operation example of the present system.

A representative operation example of the present system will be described referring to FIG. 4. FIG. 4 illustrates a case in which a user 6 sets a print setting by operating the PC 1, and instructs the printer 3 to perform printing. The print setting UI 81 displayed on the PC 1 has a PC common setting UI 82 and a printer individual setting UI 83. The print setting result by the print setting UI 81 is set in the print document 70.

The print document 70 is sent to the printer 3. The printer 3 prints a print output 78 based on the print document 70 setting. In the print setting, the responsibility for the setting items are divided between the PC 1 and the printer 3 in a cooperative manner.

The present system including this representative operation example will now be described. Following this, an outline of the print setting UI configured from the PC 1 and the printer 3 setting screens will be described.

An outline of the print setting UI configured from the PC 1 and the printer 3 setting screens will be described referring to FIGS. 5A and 5B.

Figure 5A:
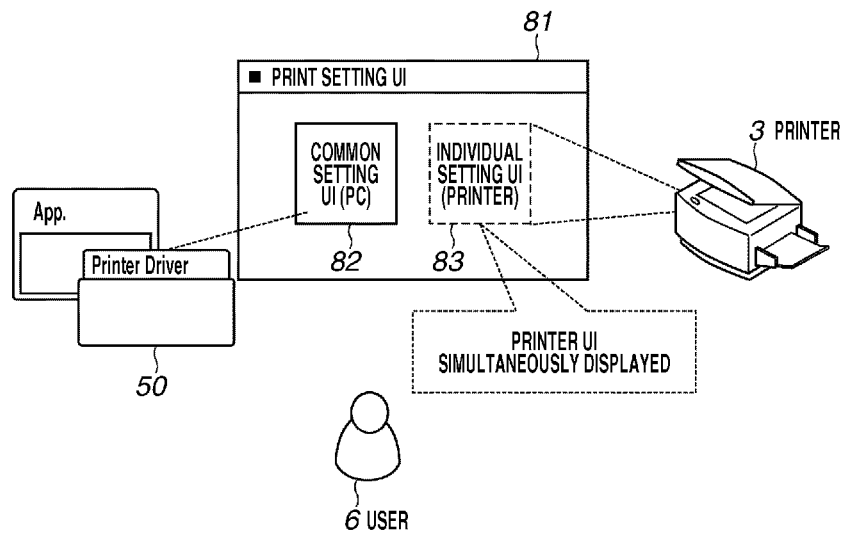
FIG. 5A illustrates an example in which a PC setting screen and a printer setting screen are simultaneously displayed.

FIG. 5A illustrates an example in which a PC 1 setting screen and a printer 3 setting screen are simultaneously displayed. The PC common setting UI 82 and the printer individual setting UI 83 are simultaneously displayed by the print setting UI 81.

The common setting UI 82 is a UI formed on the PC side like the UI display of the application or printer driver software 50. The individual setting UI 83 is a print setting UI that the printer 3 has, and is displayed by the PC 1. The user 6 sets the print setting by operating the UIs on the PC side (information processing apparatus side) and the printer side together.

Figure 5B:
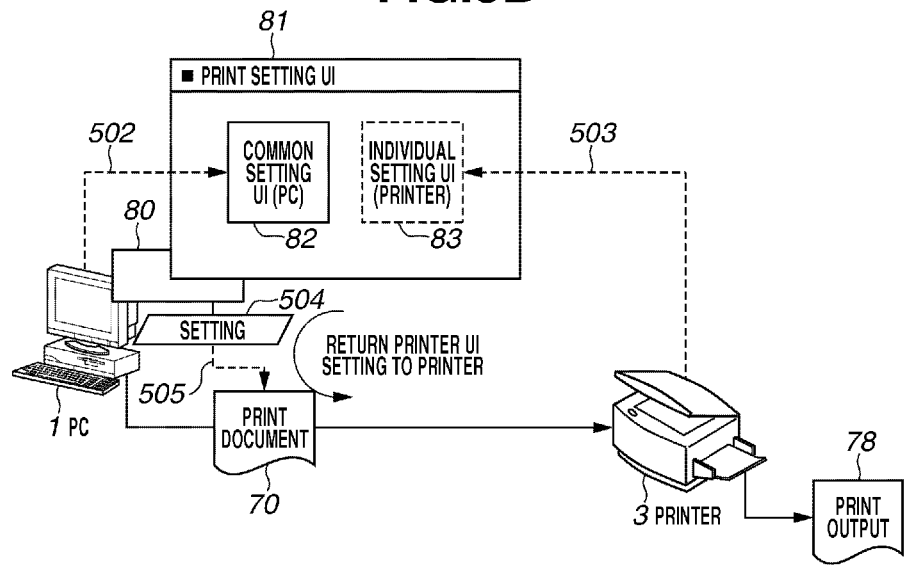
FIG. 5B illustrates an example of setting a PC and a printer UI setting result in a document.

FIG. 5B illustrates an example of setting a PC and a printer UI setting result in a document. The common setting UI 82 is formed and displayed by the PC side (502). The individual setting UI 83 is displayed by the setting UI that the printer has (503).

The print setting unit 80 sets a setting result 504 of these UIs in the print document 70 (505). The printer 3 receives the setting result of the individual setting UI 83, which is the printer 3 UI, via the print document 70.

Above, an example in which the print setting UI is configured from the PC and the printer setting screens, and the setting result is set in the document has been described. Next, an example will be described in which the UI display of the present system changes based on the user's usage location.

Figure 6:
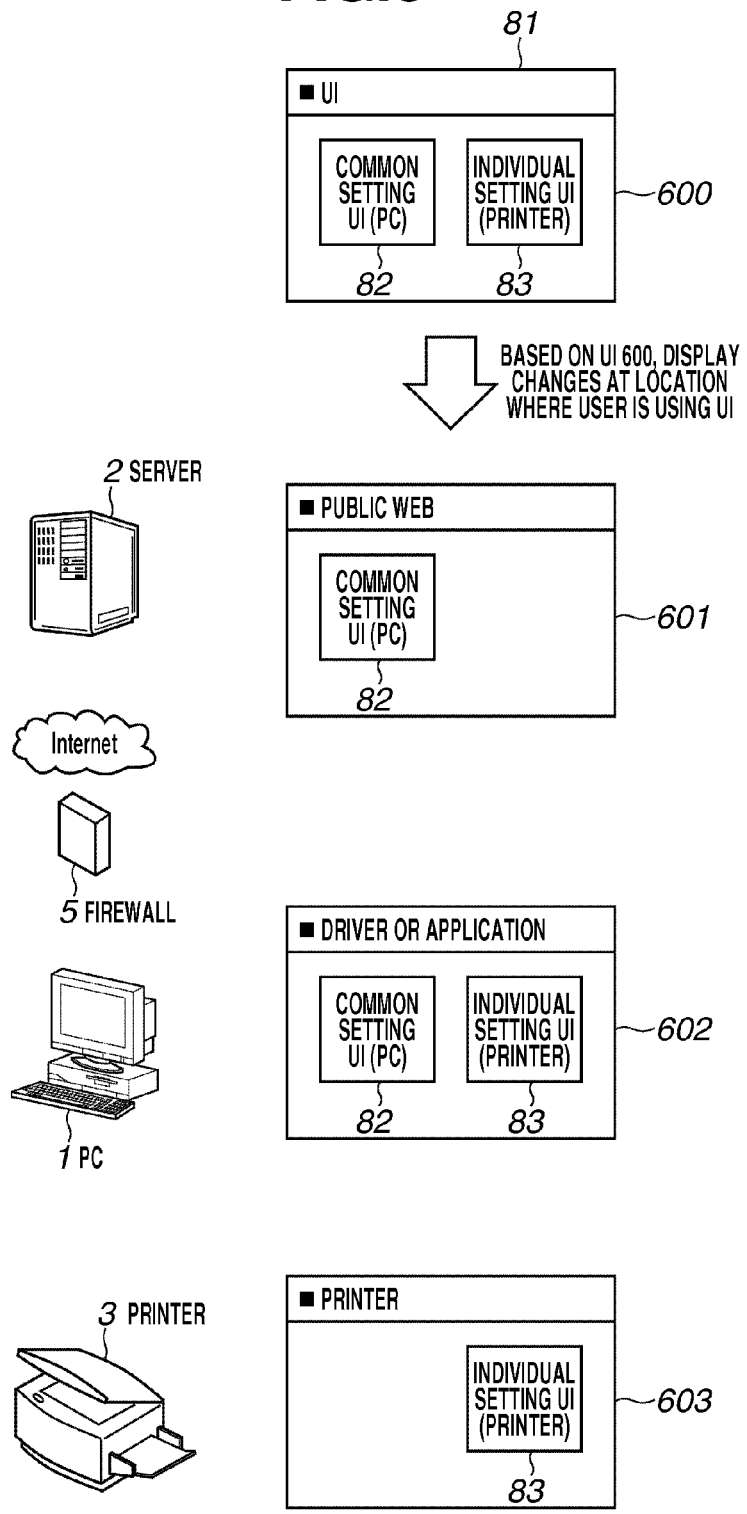
FIG. 6 illustrates an example in which the print setting UI display of the present system changes based on a user's usage location.

FIG. 6 illustrates an example in which the print setting UI display of the present system changes based on the user's usage location. In this example, the PC 1 UI and the printer 3 UI are made to cooperate so as to match the user's usage location.

The control unit 85 displays the PC common setting UI 82 and the printer individual setting UI 83 on the print setting UI 81 in the UI 600 together.

On the other hand, when the control unit 85 is executed by the server 2 on the WAN side, the control unit 85 only displays the common setting UI 82 (PC) (UI 601). This is because the server 2 usually cannot specify the printer 3, which is behind a firewall 5. Therefore, the control unit 85 does not display the individual setting UI 83 (printer).

When the control unit 85 is executed by the PC 1 on the LAN side, as described above, the control unit 85 displays the common setting UI 82 (PC) and the individual setting UI 83 (printer) together (UI 602). Since the printer 3 can usually be specified by the PC 1, the control unit 85 also displays the individual setting UI 83 (printer).

Further, when the control unit 85 is executed by the printer 3 on the LAN side, the control unit 85 only displays the individual setting UI 83 (printer) (UI 603). This is because access to the PC 1 operated by the user 6 from the printer 3 is difficult.

Above, the example in which the UI display of the present system changes based on the user's usage location has been described. Next, how the setting items are divided between the PC 1 UI and the printer 3 UI in the present system will be described.

Figure 7A:
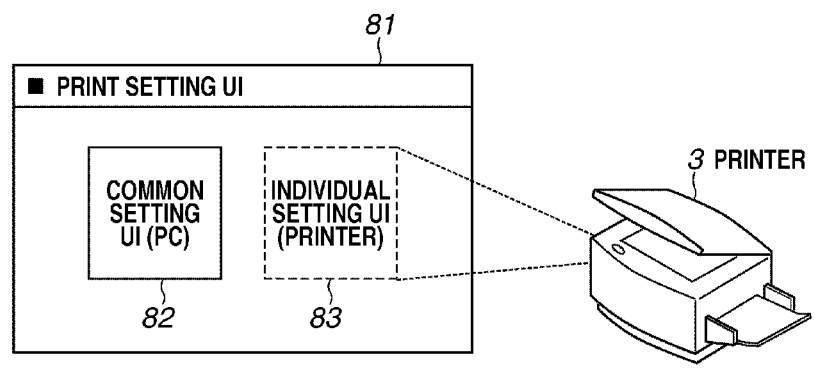
FIG. 7A is a schematic diagram illustrating how setting items are divided between the PC UI and the printer UI in the present system.

The division of the setting items between the PC UI and the printer UI in the present system will be described referring to FIGS. 7A and 7B. While maintaining the above-described PC 1 and printer 3 UI arrangement, the present system further divides the setting target items into a common print setting and an individual print setting. FIG. 7A is a schematic diagram illustrating how setting items are divided between the PC UI and the printer UI in the present system.

The print setting UI 81 is configured from the print setting UI 81 and the individual setting UI 83. The common setting UI 82, which is a PC side UI, is responsible for the common setting items in printing that do not depend on the printer. The individual setting UI 83, which is a printer side UI, is responsible for the individual setting items that do depend on the printer.

Figure 7B:
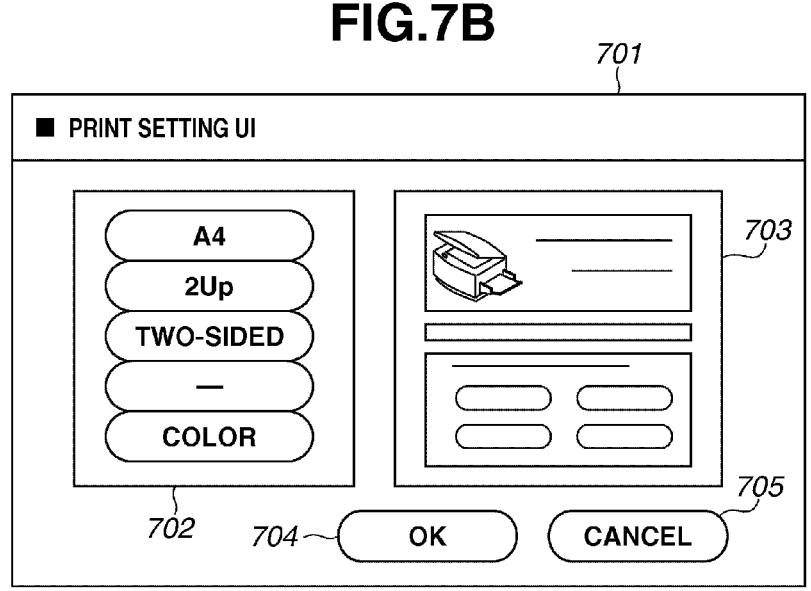
FIG. 7B illustrates a more specific example of how setting items are divided between the PC UI and the printer UI in the present system.

FIG. 7B illustrates a more specific example of how setting items are divided between the PC UI and the printer UI in the present system.

In a print setting UI 701, a common setting UI 702 and an individual setting UI 703 are displayed. The common setting UI 702 is a UI on the PC side, which displays general setting items such as paper size, N-up, two-sided, and color that are common to printers. The individual setting UI 703 is a UI on the printer side, which displays setting items that are individual to printers. The common setting UI 702 items may be included in the setting items of the individual setting UI 703. If the user presses an "OK" button 704, the print setting is saved. If the user presses a "cancel" button 705, the print setting is not saved.

Further, common setting items include "paper size, paper direction, feed method, number of copies, copy units, resolution, color mode, N-up, magnification, both-sided, staple, binding direction, bookbinding, paper type, and job name". The relationship in the setting items between the common setting UI 702 and the individual setting UI 703 will be described using stapling as an example.

The "staple" item in the common setting UI 702 may be a value set to "ON/OFF", for example. If "staple" in the common setting UI 702 is "ON", for example, the top left of the print product will be stapled. On the other hand, the "staple" item in the individual setting UI 703 of a predetermined printer may be set to the value "top left/bottom left/top right/bottom right/right/top/bottom" and "one location/two locations", for example.

The "staple" item in the individual setting UI 703 may be set in more detail based on the capabilities of the finisher mounted in the printer. Thus, when the common setting UI 702 and the individual setting UI 703 include the same setting item, the individual setting UI 703 will generally have more detailed setting values.

Above, an example in which the PC UI in the present system is responsible for the common setting and the printer UI in the present system is responsible for the individual setting has been described. Next, the configuration of the print setting data for the common setting and the individual setting will be described.

The configuration of the print setting data in the common setting and the individual setting will be described referring to FIGS. 8A and 8B. Similar to the UI screens, the print setting data is divided into a common setting and an individual setting.

Figure 8A:
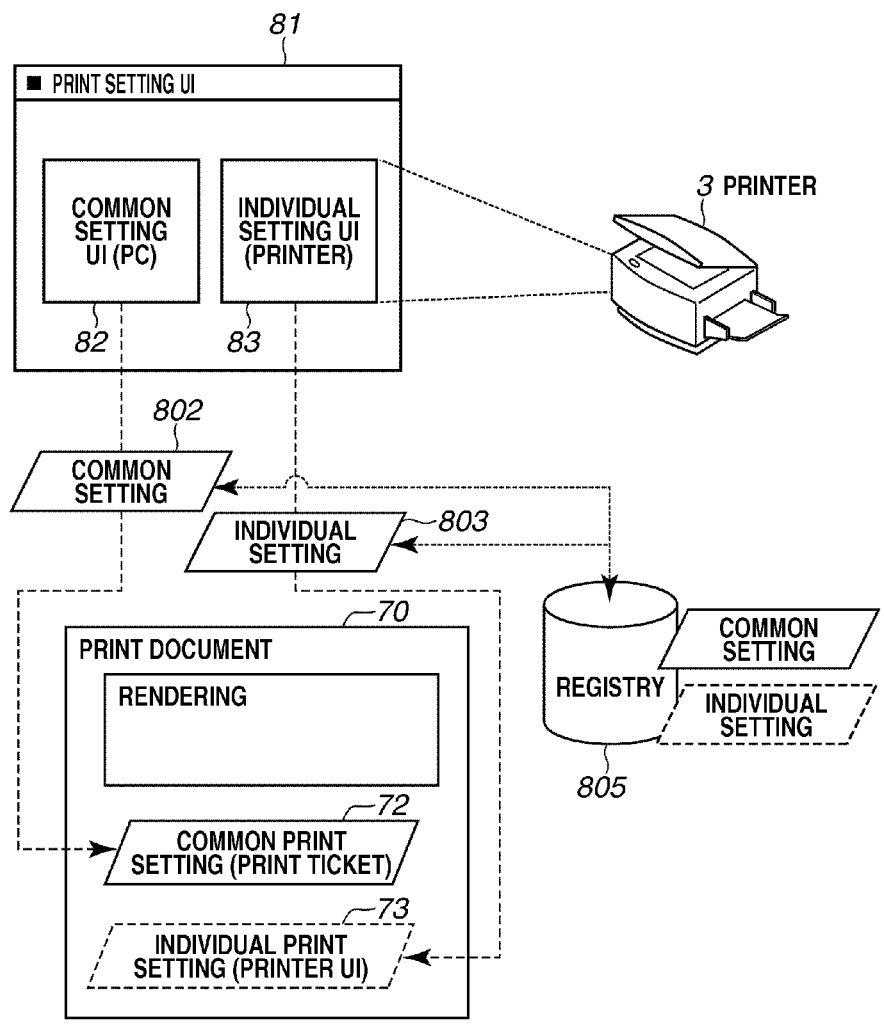
FIG. 8A is a schematic diagram of the configuration of the PC and printer print setting data.

FIG. 8A is a schematic diagram of the configuration of the PC and the printer print setting data. Similar to the division between the print setting UIs, the print setting data is configured from a common setting 802 and an individual setting 803. As described above, the print setting UI 81 is configured from the common setting UI 82 (PC) and the individual setting UI 83 (printer).

The common setting UI 82 outputs the common setting 802 as print setting data. Further, the individual setting UI 83 outputs the individual setting 803 as print setting data. The common setting 802 and individual setting 803 are stored in a registry 805.

The print document 70 is configured from a common print setting 72 and an individual print setting 73. The common setting 802 is set in the print document 70 in a print ticket format as the common print setting 72. The individual setting 803 is set in the print document 70 as data that is exported from the individual setting UI 83 (printer) as the individual print setting 73.

A "print ticket" is usually data that stores the print setting and attributes, and is often described in an extensible markup language (XML) format. A more specific example of the print ticket will be described below.

Figure 8B:
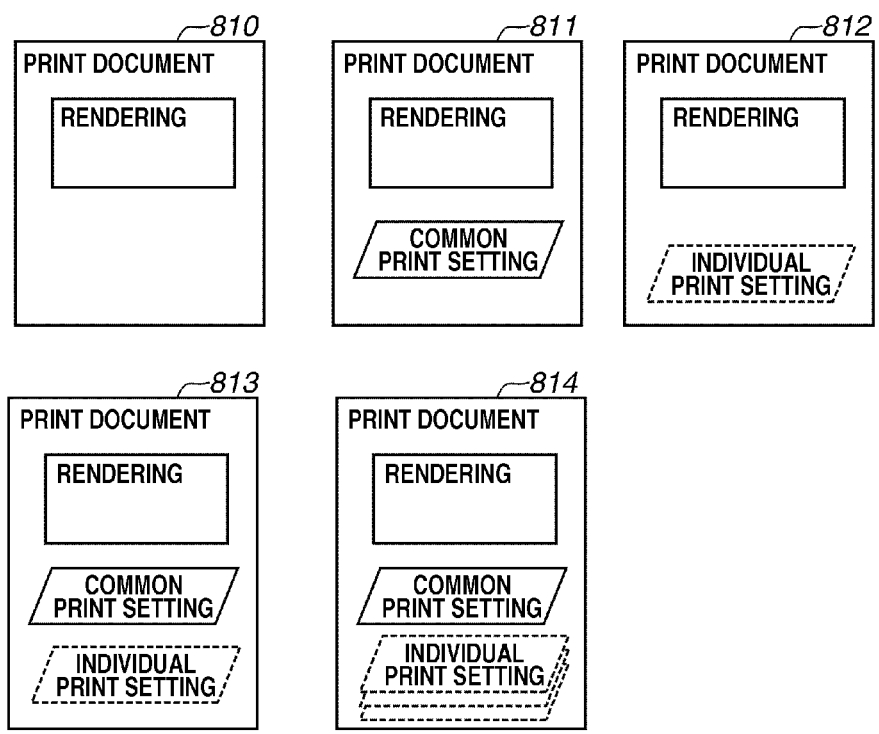
FIG. 8B illustrates an example of a setting pattern between a common print setting and an individual print setting in a print document.

FIG. 8B illustrates an example of a setting pattern between the common print setting and the individual print setting in the print document. The common print setting 72 and the individual print setting 73 do not have to be stored in the print document. Further, the common print setting 72 is generally one setting.

A plurality of individual print settings 73 may be stored in the print document, since the settings are different for each printer. Pattern examples include no print setting (810), common print setting 72 only (811), individual print setting 73 only (812), one common print setting 72 and one individual print setting 73 (813), and a plurality of individual print settings 73 (814).

Above, the configuration of the print setting data in the common setting and the individual setting has been described. Next, a more specific example of the print setting data and the work data will be described.

A more specific example of the print setting data and the work data will be described referring to FIGS. 9A and 9B. Before the description of FIGS. 9A and 9B, an XML paper specification (XPS) document will be briefly described. XPS documents describe the contents of a page in XML format, and include the contents to be actually displayed or printed. Further, XPS documents also include resources such as the fonts and the images to be used.

Moreover, XPS documents may have the print setting as a print ticket (PT). A PT describes the print setting when printing an XPS document in an XML format. Next, the print document 70 in FIG. 9A will be described as an XPS document or a document that is in a similar format.

Figure 9A:
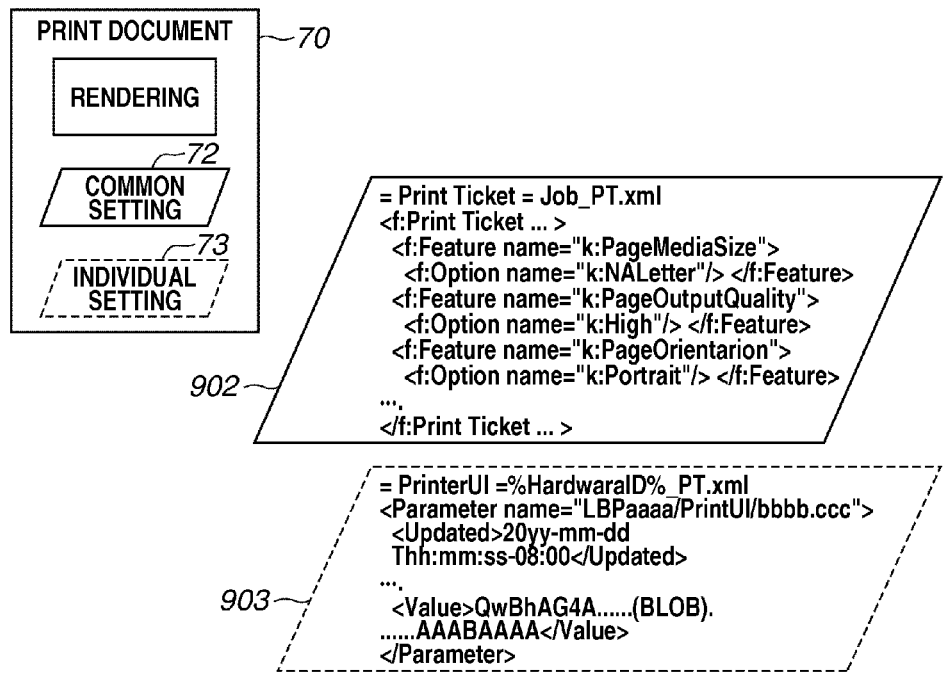
FIG. 9A illustrates a more specific example of a common print setting and an individual print setting.

FIG. 9A illustrates a more specific example of the common print setting and the individual print setting. The common print setting 72 is stored in the print document 70 in the form of an XML file 902. The XML file 902 is an XML file entitled "Job_PT.xml". The above-described common print setting items paper size, paper direction, resolution and the like are described in the following print ticket format.

<f: PrintTicket . . . > . . . </f:PrintTicket>

The individual print setting 73 is stored in the print document 70 in the form of a file 903. The file 903 is an XML file entitled "% HardwareID%_PT.xml". The string "%HardwareID%" is a hardware ID character string unique to the printer 3 that is used for the file name.

After the file management information, such as the name of the printer setting UI and the update date and time, the printer print setting data is described in a binary large object (BLOB) format like the following.

<Value>QwBhAG4A . . . (BLOB) . . . AAABAAAA</Value>

The BLOB format will be used to describe an example of the export, storage, and import of the printer print setting data as an XML file. Since the individual print setting 73 is data that is handled by the printer 3, another format may also be selected.

The individual print setting 73 can also be described in a print ticket format. In this case, the individual print setting 73 and the common print setting 72 can be distinguished by adding a unique name space to the individual print setting 73.

Figure 9B:
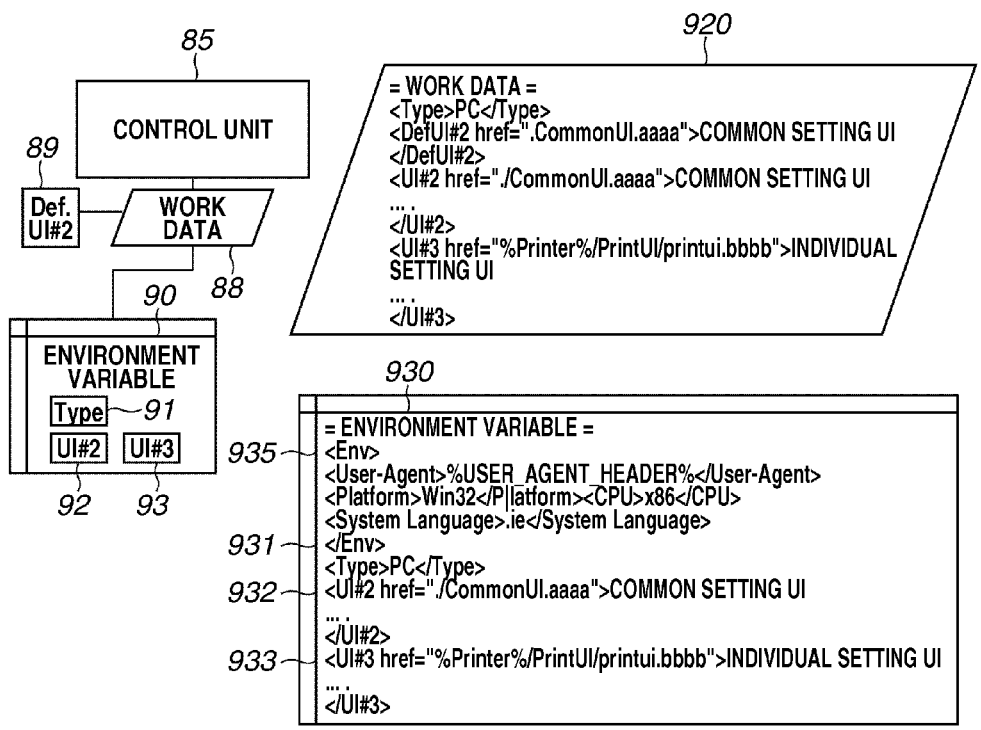
FIG. 9B illustrates a more specific example of an environment variable and work data.

FIG. 9B illustrates a more specific example of the environment variable 90 and the work data 88. The control unit 85 generates the work data 88 by referring to the environment variable 90. Description 930 is a more specific example of the environment variable 90.

A type 931 is a variable in which the type of execution environment is described. The type 931 is set as a PC or printer value. The type 931 is referred to by the control unit 85 when the control unit 85 controls the display of the common setting UI 82 (PC) and the individual setting UI 83 (printer). This type 931 may also serve as a service end point. In this case, the control unit 85 can also determine that the type 931 value indicates a printer if it is a service end point.

UI #2 932 and UI #3 933 are data indicating the print setting UI 81 or the individual setting UI 83 to be utilized. The control unit 85 can distinguish the position of the UI, specifically, whether it is local or remote, based on the uniform resource identifier (URI) address of the UI #2 932 and the UI #3 933.

ENV 935 is also a variable for the execution environment platform and the CPU information. This ENV 935 is used to determine the execution environment when the type 931 is not set as a variable.

The platform variable may be set as a Win 32 or similar value based on a JAVA® variable. A user-agent header is a hypertext transfer protocol (HTTP) variable that can be used to determine whether to apply a unique character string to the printer environment.

Description 920 is a more specific example of the work data 88. The data format of the description 920 is nearly identical to that of the environment variable 930. The control unit 85 builds the work data 920 while loading the default work data and referring to the type 913, the UI #2 932, and the UI #3 933 of the environment variable 930.

Above, the more specific example of the print setting data and the work data has been described. Next, a data workflow of the print setting data will be described.

Figure 10B:
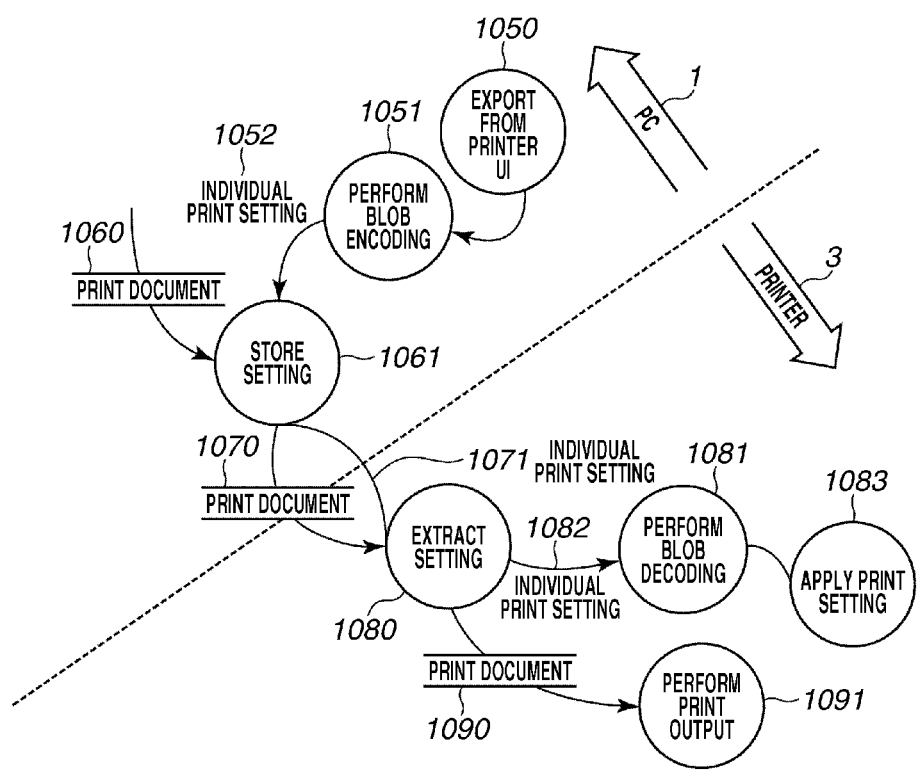
FIG. 10B illustrates a data flow of the individual print setting from the PC to the printer.

The data workflow of the print setting data will be described referring to FIGS. 10A and 10B. FIG. 10A illustrates an example in which print settings are sequentially set while the print document 70 moves between different environments.

First, at the server 2, the common setting UI 82 is displayed on a print setting UI 1010. The operation result of the common setting UI 82 is reflected in the common print setting 72 of the print document 70 as indicated by 1012.

Next, at the PC 1, the common setting UI 82 and the individual setting UI 83 are displayed on a print setting UI 1020. The operation result of the common setting UI 82 is reflected in the common print setting 72 of the print document 70 as indicated by 1022. The operation result of the individual setting UI 83 is reflected in the individual print setting 73 of the print document 70 as indicated by 1023.

Finally, at the printer 3, the individual setting UI 83 is displayed on a print setting UI 1030. The operation result of the individual setting UI 83 is reflected in the individual print setting 73 of the print document 70 as indicated by 1033. The print document 70 then moves between the server 2, the PC 1, and the printer 3.

The common print setting 72 and the individual print setting 73 print settings move with the print document 70. Then, the user can set the print setting by operating the common setting UI 82 and the individual setting UI 83 on the print setting UI 81 that is appropriate for each environment.

FIG. 10B illustrates a data flow of the individual print setting 73 from the PC 1 to the printer 3. The print setting data exported from the individual setting UI 83 (printer) is stored as the individual print setting 73 in the print document 70, returns to the printer, and is imported as print setting data. In this print setting flow, processing to interpret the individual print setting 73 on the PC side is not performed.

In the side indicated by arrow 1, the data flow on the PC 1 is illustrated.

In process 1050, the control unit 85 in the PC 1 exports the print setting from the individual setting UI 83 (printer).

In process 1051, the control unit 85 in the PC 1 performs BLOB encoding on that print setting. Then, the individual print setting 73 of data 1052 is output, and the print document 70 of data 1060 is input.

Next, in process 1061, the control unit 85 in the PC 1 performs setting storage based on the input print document 70 and the individual print setting 73. The individual print setting 73 of data 1071 is stored in the print document 70 of data 1070. The individual print setting 73 is stored in the print document 70, and sent to the printer 3.

In the side indicated by an arrow 3, the data flow on the printer 3 is illustrated.

In process 1080, with the print document 70 in which the individual print setting 73 is stored as an input, the control unit 85 in the printer 3 extracts the setting. Then, the individual print setting 73 of data 1081 is extracted. In process 1082, the control unit 85 in the printer 3 performs BLOB decoding on the individual print setting 73.

In process 1083, the control unit 85 in the printer 3 applies this print setting. With the print document 70 of data 1090 as an input, in process 1091, the control unit 85 in the printer 3 performs print output. This print setting is applied in process 1083.

Above, the data flow of the print setting data has been described. Next, the flow of the present system will be described.

FIG. 11 is a flowchart illustrating formation of work data by the control unit 85. From step S1110, the control unit 85 starts the work data generation flow. In step S1111, the control unit 85 loads the default work data.

In step S1120, the control unit 85 determines whether there is a type environment variable. If there is a type environment variable (YES in step S1120), the processing proceeds to step S1121. If there is not a type environment variable (NO in step S1120), the processing proceeds to step S1122. In step S1121, the control unit 85 updates the work data type variable.

In step S1122, the control unit 85 determines whether there is a second UI (UI #2) environment variable. If there is a second UI environment variable (YES in step S1122), the processing proceeds to step S1123. If there is not a second UI environment variable (NO in step S1122), the processing proceeds to step S1124. In step S1123, the control unit 85 updates the work data UI #2.

In step S1124, the control unit 85 determines whether there is a third UI (UI #3) environment variable. If there is a third UI environment variable (YES in step S1124), the processing proceeds to step S1125. If there is not a third UI environment variable (NO in step S1124), the processing proceeds to step S1130. In step S1125, the control unit 85 updates the work data UI #3.

In step S1130, the control unit 85 determines whether the above three variables have been acquired. If these three variables have been acquired (YES in step S1130), the control unit 85 finishes the processing illustrated in FIG. 11. If these three variables have not been acquired (NO in step S1130), the processing proceeds to step S1140. In step S1140, the control unit 85 obtains an execution environment variable (Platform, CPU, Lang, User-Agent).

In step S1142, the control unit 85 determines whether there is a match with the printer execution environment variable. If there is a match (YES in step S1142), the processing proceeds to step S1143. If there is no match (NO in step S1142), the control unit 85 finishes the processing illustrated in FIG. 11. In step S1143, the control unit 85 sets the work data type to printer. In step S1144, the control unit 85 sets the work data second UI (UI #2) to blank.

The description of the flow illustrated in FIG. 11 will now be supplemented. When work data is generated, the type is determined as being either a PC or a printer. If there is a flowchart corresponding to the type thereafter, the flowchart is treated as processing performed by referring to work data by the control unit 85. Duplicate descriptions will be omitted.

In this case, the default type is the PC. Unless the type is determined to be a printer based on a determination that there is no type variable and the determination of the execution environment, the type will be PC (NO in step S1124). In this case too, since the type is a PC type, at least the common print setting is valid.

FIG. 12 is a flowchart illustrating generation of the print setting UI by the control unit. From step S1211, the control unit 85 starts reading the setting. In step S1212, the control unit 85 reads the common setting. In step S1213, the control unit 85 reads the individual setting. In step S1214, the control unit 85 determines whether there is a pre-setting. If there is a pre-setting (YES in step S1214), the processing proceeds to step S1220. If there is no pre-setting (NO in step S1214), the processing proceeds to step S1215.

In step S1215, the control unit 85 loads the default setting. From step S1220, the control unit 85 starts the UI display. In step S1221, the control unit 85 locks the display. In step S1222, the control unit 85 proceeds to the background. In step S1223, the control unit 85 displays a print setting UI (first). In step S1224, the control unit 85 calls a flow number (2, common).

In step S1225, the control unit 85 calls a flow number (3, individual). In step S1226, the control unit 85 proceeds to the foreground. In step S1227, the control unit 85 unlocks the display.

In step S1231, the control unit 85 determines whether the OK button has been pressed. If the OK button has been pressed (YES in step S1231), the processing proceeds to step S1240. If the OK button has not been pressed (NO in step S1231), the processing returns to step S1230. From step S1240, the control unit 85 starts writing the setting. In step S1241, the control unit 85 writes the common setting. In step S1242, the control unit 85 writes the individual setting. In step S1243, the control unit 85 performs BLOB encoding on the individual setting.

Step S1250 is the start of flow number (2, common). From step S1251, the control unit 85 starts building the common setting UI 82.

In step S1252, the control unit 85 determines whether there is a second UI variable (UI #2) in the work data. If there is a second UI variable (YES in step S1252), the processing proceeds to step S1253. If there is not a second UI variable (NO in step S1252), the processing proceeds to step S1254. In step S1253, the control unit 85 displays the common setting UI 82. In step S1254, the control unit 85 does not display the common setting UI 82.

Step S1260 is the start of flow number (3, individual). From step S1261, the control unit 85 starts building the individual setting UI 83.

In step S1262, the control unit 85 determines whether there is a third UI variable (UI #3) in the work data. If there is a third UI variable (YES in step S1262), the processing proceeds to step S1263. If there is not a third UI variable (NO in step S1262), the processing proceeds to step S1282. In step S1263, the control unit 85 confirms whether the third UI variable (UI #3) indicates local. If the third UI variable indicates local (YES in step S1263), the processing proceeds to step S1280. If the third UI variable does not indicate local (NO in step S1263), the processing proceeds to step S1264.

In step S1280, the control unit 85 displays the local individual setting UI 83 (local). The term "local individual setting UI" refers to, for example, a local individual setting UI stored in a storage unit of that device.

In step S1264, the control unit 85 generates request data. In step S1265, the control unit 85 sends the request data to the printer 3.

In step S1266, the control unit 85 determines whether communication with the printer 3 is possible. If communication is possible (YES in step S1266), the processing proceeds to step S1267. If communication is not possible (NO in step S1266), the processing proceeds to step S1282. In step S1267, the control unit 85 receives a response.

In step S1268, the control unit 85 confirms the response and determines whether a result is possible. If a result is possible (YES in step S1268), the processing proceeds to step S1281. If a result is not possible (NO in step S1268), the processing proceeds to step S1282. In step S1281, the control unit 85 displays a remote individual setting UI 83 (remote). The term "remote individual setting UI" refers to, for example, the UI of the printer 3 that is connected via a network.

In step S1282, the control unit 85 does not display the individual setting UI 83. In step S1283, the control unit 85 sets the work data UI #3 for which communication was impossible to blank.

To supplement the flowchart of FIG. 12, next a PC 1 and printer 3 sequence diagram of the print setting UI will be described.

FIG. 13 is a PC and printer sequence diagram of the print setting UI 81. Basically, the sequence illustrates a flow in which once the common setting UI 82 (PC 1) and the individual setting UI 83 (printer) have been displayed and the UI settings finished, then the respective setting results are written. When displaying the individual setting UI 83 (printer) in the PC 1, the control unit 85 makes a request to the printer 3 for the UI, and obtains a response from the printer 3.

In step S1321, the display control unit 86 in the control unit 85 locks the screen. In step S1323, the display control unit 86 in the control unit 85 displays the print setting UI 81. From step S1351, the display control unit 86 in the control unit 85 starts building the common setting UI 82.

In step S1352, the display control unit 86 in the control unit 85 confirms the work data UI #2. In step S1353, if there is a UI #2, the display control unit 86 in the control unit 85 displays the common setting UI 82. From step S1361, the display control unit 86 in the control unit 85 starts building the individual setting UI 83. In step S1362, the display control unit 86 in the control unit 85 confirms the work data UI #3.

If the UI #3 indicates that it is local, in step S1380, the display control unit 86 in the control unit 85 displays the individual setting UI 83 (local). If the UI #3 indicates that it is not local (indicates remote), in step S1364, the display control unit 86 in the control unit 85 generates request data.

In step S1365, the display control unit 86 in the control unit 85 sends a request to the printer 3. In step S1367, the display control unit 86 in the control unit 85 receives a response from the printer 3.

If the UI #3 indicates remote, and the printer 3 can be communicated with and accessed, in step S1381, the display control unit 86 in the control unit 85 displays the individual setting UI 83 (remote).

In the present exemplary embodiment, to display the individual setting UI 83, a remote UI function of the printer 3 is used. The remote UI function is a function that can access the printer 3 from a web browser via a network, confirm the status of the printer 3, and operate and set various settings in the printer 3.

Therefore, the printer 3 includes a web server for using the remote UI. The sending by the web browser of the individual setting UI page requested from the display control unit 86 in the control unit 85 makes the display control unit 86 in the control unit 85 display the individual setting UI 83.

If communication and access to the printer 3 is not possible, in step S1382, the display control unit 86 in the control unit 85 does not display the individual setting UI 83. In step S1327, the display control unit 86 in the control unit 85 unlocks the display. From step S1340, the display control unit 86 in the control unit 85 writes the setting result.

In step S1342, the display control unit 86 in the control unit 85 requests setting of a common setting UI 82. In step S1343, the display control unit 86 in the control unit 85 requests setting of an individual setting UI 83. Above, the PC 1 and printer 3 sequence diagram of the print setting UI has been described. Next, a flow of storing the print setting data in the print document by the PC 1 will be described.

Figure 14:
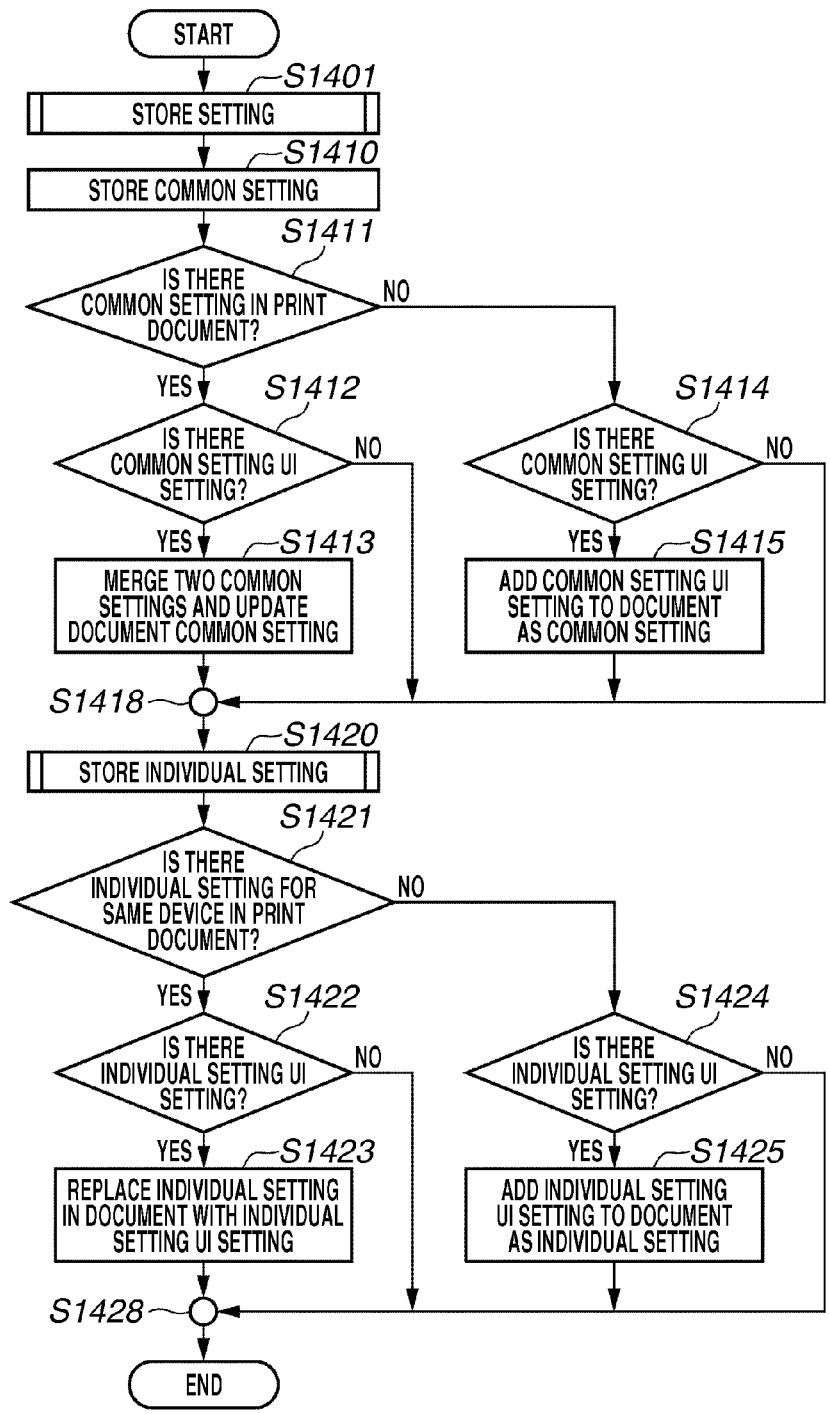
FIG. 14 is a flowchart illustrating storage of print setting data in the print document by the PC.

FIG. 14 is a flowchart illustrating storage of print setting data in the print document 70 by the PC 1.

In addition to the print setting in the print document 70, the control unit 85 changes an operation based on whether there is a setting result. Further, the control unit 85 performs control that is based on the target printer regarding the individual setting.

Further, the control unit 85 handles the common print setting 72 and the individual print setting 73 differently. Concerning the common print setting 72, the control unit 85 merges and updates the setting, because the setting is common to various locations. Concerning the individual print setting 73, the control unit 85 replaces the setting, because the setting is individual to that printer.

From step S1401, the control unit 85 starts setting storage. From step S1410, the control unit 85 starts storage of the common print setting 72. In step S1411, the control unit 85 determines whether there is a common print setting 72 in the print document 70. If there is a common print setting 72 (YES in step S1411), the processing proceeds to step S1412. If there is not a common print setting 72, the processing proceeds to step S1414.

In step S1412, the control unit 85 determines whether there is a common setting UI 82 setting result. If there is a common setting UI 82 setting result (YES in step S1412), the processing proceeds to step S1413. If there is not a common setting UI 82 setting result (NO in step S1412), the processing proceeds to step S1418. In step S1413, the control unit 85 merges the common print setting 72 and the common setting UI 82 setting result for the print document 70, and updates the common print setting 72 for the document.

In step S1414, the control unit 85 determines whether there is a common setting UI 82 setting result. If there is a common setting UI 82 setting result (YES in step S1414), the processing proceeds to step S1415. If there is not a common setting UI 82 setting result (NO in step S1414), the processing proceeds to step S1418. In step S1415, the control unit 85 inputs the common setting UI 82 setting result into the print document 70 as the common print setting 72.

From step S1420, the control unit 85 starts storage of the individual print setting 73. In step S1421, the control unit 85 determines whether there is an individual print setting 73 for the same device in the print document 70. If there is (YES in step S1421), the processing proceeds to step S1422, and if there isn't (NO in step S1421), the processing proceeds to step S1424.

In step S1422, the control unit 85 determines whether there is an individual setting UI 83 setting result. If there is an individual setting UI 83 setting result (YES in step S1422), the processing proceeds to step S1423. If there is not an individual setting UI 83 setting result (NO in step S1422), the processing proceeds to step S1428. In step S1423, the control unit 85 replaces the individual print setting 73 in the print document 70 with the individual setting UI 83 setting result.

In step S1424, the control unit 85 determines whether there is an individual setting UI 83 setting result. If there is an individual setting UI 83 setting result (YES in step S1424), the processing proceeds to step S1425. If there is not an individual setting UI 83 setting result (NO in step S1424), the processing proceeds to step S1428. In step S1425, the control unit 85 inputs the individual setting UI 83 setting result into the print document 70 as the individual print setting 73.

In the flowchart of FIG. 14, the individual setting UI 83 setting result has finished BLOB encoding. Above, a flowchart illustrating the storage of the print setting data in the print document 70 by the PC 1 has been described.

For the PC 1, the programs relating to the flowcharts up until this point are stored in the HDD 1202, read into the RAM 1201, and executed by the CPU 1204. For the printer 3, the programs relating to the flowcharts up until this point are stored in the ROM 16, read into the RAM 17, and executed by the CPU 15. Further, the programs and data received based on external communication via the NB 1207 and the communication unit 18 are executed by the CPU 1204 and the CPU 15. The processing according to the present exemplary embodiment has been described above.

As described above, there have been problems with print setting operations in a conventional WAN environment. Specifically, even though the output printer is undetermined, it is necessary to provide a certain level of print setting operations to the user even in such an undetermined printer environment. Further, users want to fully utilize the functions of the actual output printer.

To resolve these problems, the system according to the present exemplary embodiment is configured from a PC 1, a printer 3, and a print setting UI. In this system, the PC 1 and the printer 3 are connected via a network, and the print setting UI is configured from a common setting UI and an individual setting UI. The common setting UI is a print setting UI on the computer side and the individual setting UI is a print setting UI on the printer side.

Further, display of the print setting UI according to the present exemplary embodiment is controlled based on the user's usage location. For example, as illustrated above in FIG. 6, if the control unit 85 (or the display control unit 86) is being operated by the server 2, the common setting UI is displayed, while if the control unit 85 is being operated by the PC 1, the common setting UI and the individual setting UI are displayed. In addition, if the control unit 85 (or the display control unit 86) is being operated by the printer 3, the individual setting UI is displayed.

Thus, according to the present exemplary embodiment, the user can perform an appropriate print setting operation regardless of whether the output printer has been determined or not. Further, even when the output printer has not been determined, the user can still obtain a certain level of operability. Moreover, if the printer has been determined, the user can fully utilize the functions of the output printer.

The improvement in operability, adaptability, immediacy, and the locatability according to the present exemplary embodiment will now be described. Due to the common setting UI 82 and the common print setting 72, a setting that matches the printer is not necessary. Therefore, the user can achieve uniform operability. Further, if a printer is connected to the present system, printing can be performed by using the common setting UI 82 to set the settings. Since the individual setting UI 83 and the individual print setting 73 enable settings that are unique to that model to be set, the functions of the output printer can be fully utilized.

Due to the display control of the common setting UI 82 and the individual setting UI 83 in the print setting UI 81 that is based on usage location, a setting unique to the output printer can be set once the printer has been determined. Consequently, the setting can be appropriately provided to the user, so that the number of resetting operations can be suppressed.

Since the common print setting 72 and the individual print setting 73 data are separate, the setting can be sequentially set while moving with the print document 70 between usage locations. Therefore, the responsiveness to changes in a plurality of printer uses and in the output printer, is increased.

Since the individual setting UI 83 and the individual print setting 73 that are unique to the printer 3 are separate from the application or printer driver software 50, the user can use a future printer even if he/she does not reinstall software on the PC side. Further, vendors do not need to develop and distribute PC software for each printer release.

The advantageous effects of the present exemplary embodiment have been described above. Next, an operation example will be described for when some of the positions in the present system configuration are changed.

Figure 15:
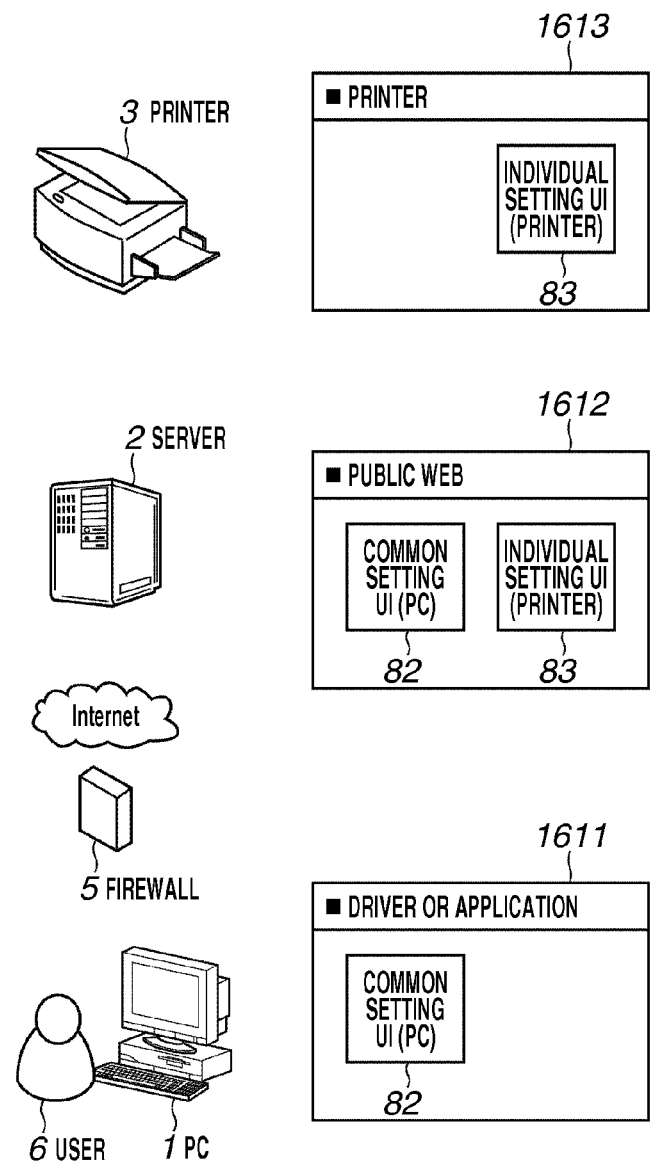
FIG. 15 illustrates an operation example when a part of the system configuration is changed.

FIG. 15 illustrates an operation example when a part of the system configuration is changed. An example of changes in the system operation for when the position of the printer 3 in the system configuration illustrated in FIG. 6 is changed will be described referring to FIG. 15.

The system configuration illustrated in FIG. 15 differs from the system configuration described referring to FIG. 6 in which the printer 3 is on the server 2 side. The printer 3 is arranged on the LAN side of the server 2. In this example, the printer 3 is arranged in a web print service center.

The common setting UI 82 (PC) and the individual setting UI 83 (printer) are displayed together by the print setting UI 81. When the print setting unit 80 is executed by the printer 3, only the individual setting UI 83 (printer) is displayed on the print setting UI 81 (1613). This is the same as the display in the first exemplary embodiment.

When the print setting unit 80 is executed by the server 2, the common setting UI 82 (PC) and the individual setting UI 83 (printer) are displayed together on the print setting UI 81 (1612). This is because the printer 3 can be specified from the server 2.

When the print setting unit 80 is executed by the PC 1, the common setting UI 82 (PC) is displayed on the print setting UI 81. This is because the printer 3, which is behind the firewall 5, cannot be specified from the PC 1.

In FIG. 15, an example is illustrated in which the server 2 and the PC 1 print setting UI is changed due to a change in the position of the printer 3. In the network configuration illustrated in the present exemplary embodiment, the user 6 can use the web service of the server 2, and can also set the individual print setting.

As described above, the display result changes due to the change in the position of the printer 3. However, the processing is the same as that illustrated in FIG. 6. Even in FIG. 6, the print setting unit 80, for example, controls the screen by determining the UI to be displayed based on communication with the printer 3 and the like. The print setting unit 80 does not control the screen based on the sections between PC environments. The reason for not determining between PC environments has been described referring to FIG. 15. The above description is mainly focused on the PC environment of the PC 1. The following description will focus on the printer 3.

Figure 16:
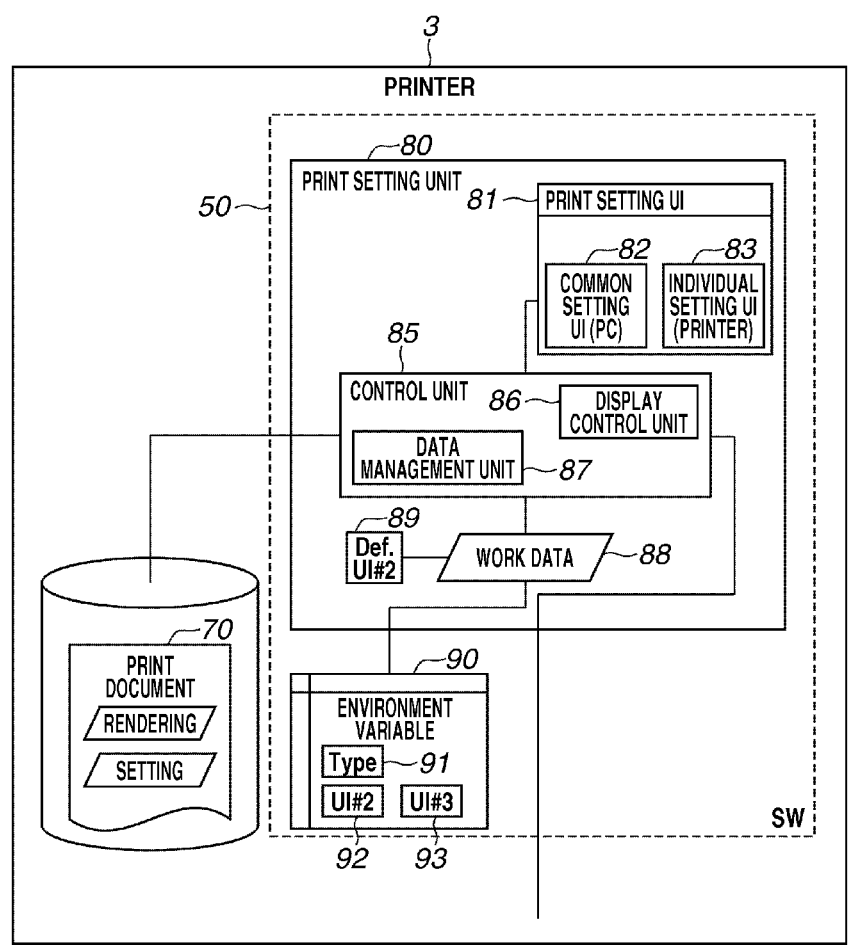
FIG. 16 is a block diagram illustrating an example of the software configuration of the printer.

FIG. 16 is a block diagram illustrating an example of the software configuration in the printer.

Software 50 is loaded in order to operate and control the printer 3. The print document 70 is a file that is received and spooled during printing by the printer 3. The print document 70 includes print rendering and setting information.

The remaining features are the same as the block diagram illustrating an example of the software configuration of the PC 1 described referring to FIG. 3. Above, a block diagram illustrating an example of the software configuration of the printer 3 has been described. Next, a representative operation example of the printer 3 in the present system will be described.

Figure 17:
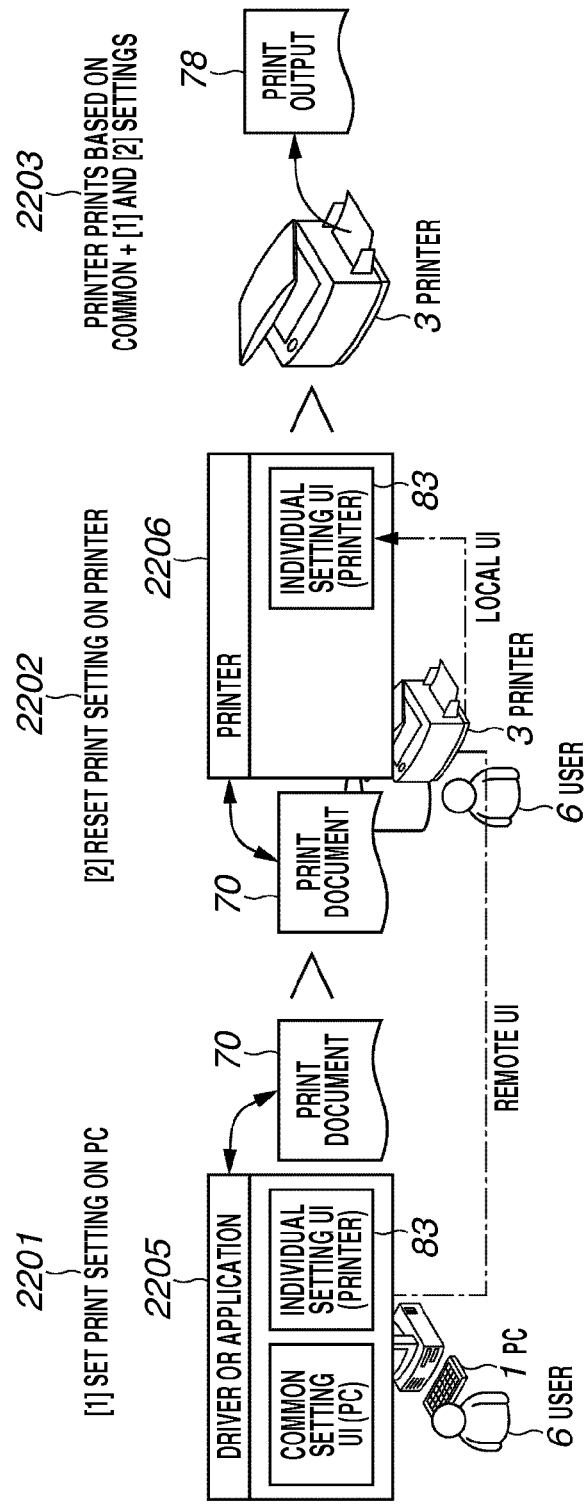
FIG. 17 illustrates a print setting operation example by the printer in the present system.

FIG. 17 illustrates a print setting operation example of the printer in the present system.

First, in 2201, the user 6 sets the print setting on the PC 1. The user 6 sets the print setting using a printer remote UI (RUI) with the individual setting UI 83 in a print setting UI 2205 displayed on the PC 1. The print setting is stored in the print document 70, and sent to the printer 3. Next, in 2202, the user 6 sets the print setting on the printer 3.

Then, the user 6 sets the print setting using a printer local UI (LUI) with the individual setting UI 83 in a print setting UI 2206 displayed on the printer 3. The print setting UI 2206 is displayed so as to reflect the setting on the PC 1. The user 6 then updates a part of the print setting, and issues a printing instruction.

Finally, in 2203, the printer 3 performs print output 78. The print setting in this print output 78 reflects the common setting and the setting results of 2201 and 2202. Above, a representative example of the printer 3 in the present system was described. Next, the configuration of the present system will be described while focusing on the printer 3.

Figure 18:
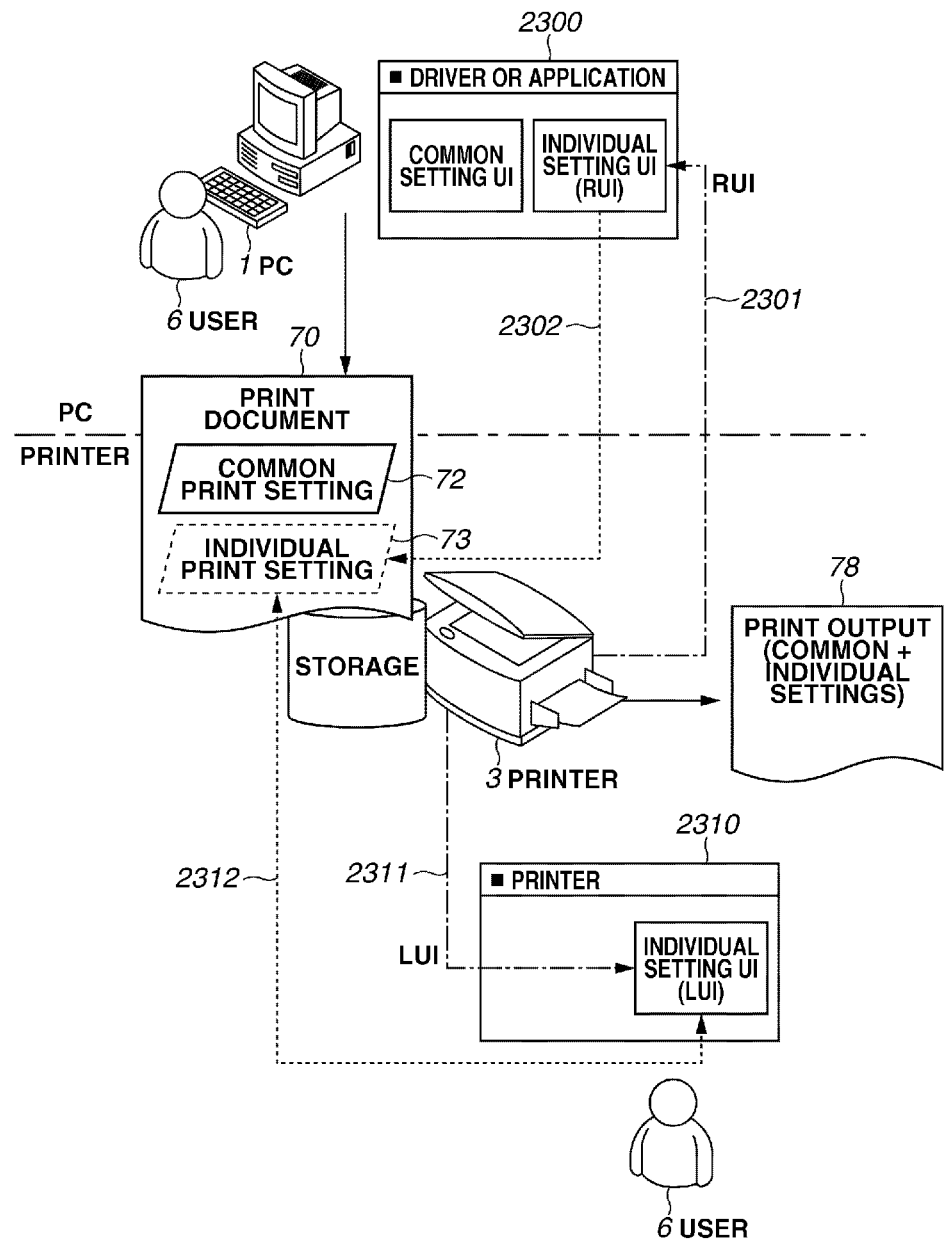
FIG. 18 illustrates an example of the printer in the present system displaying a setting screen on the PC and the printer.

FIG. 18 illustrates an example of the printer in the present system displaying a setting screen on the PC and the printer.

print setting in a print setting UI 2300 displayed on the PC 1 is the printer 3 RUI (2301). A RUI print setting (2302) is stored in the individual print setting 73 of the print document 70 and sent to the printer 3.

The printer 3 receives the print document 70. Then, the user 6 sets the print setting on the printer 3. The individual print setting in a print setting UI 2310 displayed on the printer 3 is the printer 3 LUI (2311). The printer 3 reads the individual print setting 73 of the print document 70, displays the LUI, and writes the setting result back into the individual print setting 73 (2312).

On the PC 1, the print setting result on the printer 3 is reflected in the print output 78.

In the above-described FIG. 4, an example has been described in which the print setting UI on the PC 1 displays the UIs by dividing responsibilities between the PC 1 and the printer 3 in a cooperative manner. In FIG. 18, an example is described in which the printer 3 displays two print setting UIs (RUI and LUI) in order to display and edit the print setting.

Figure 19:
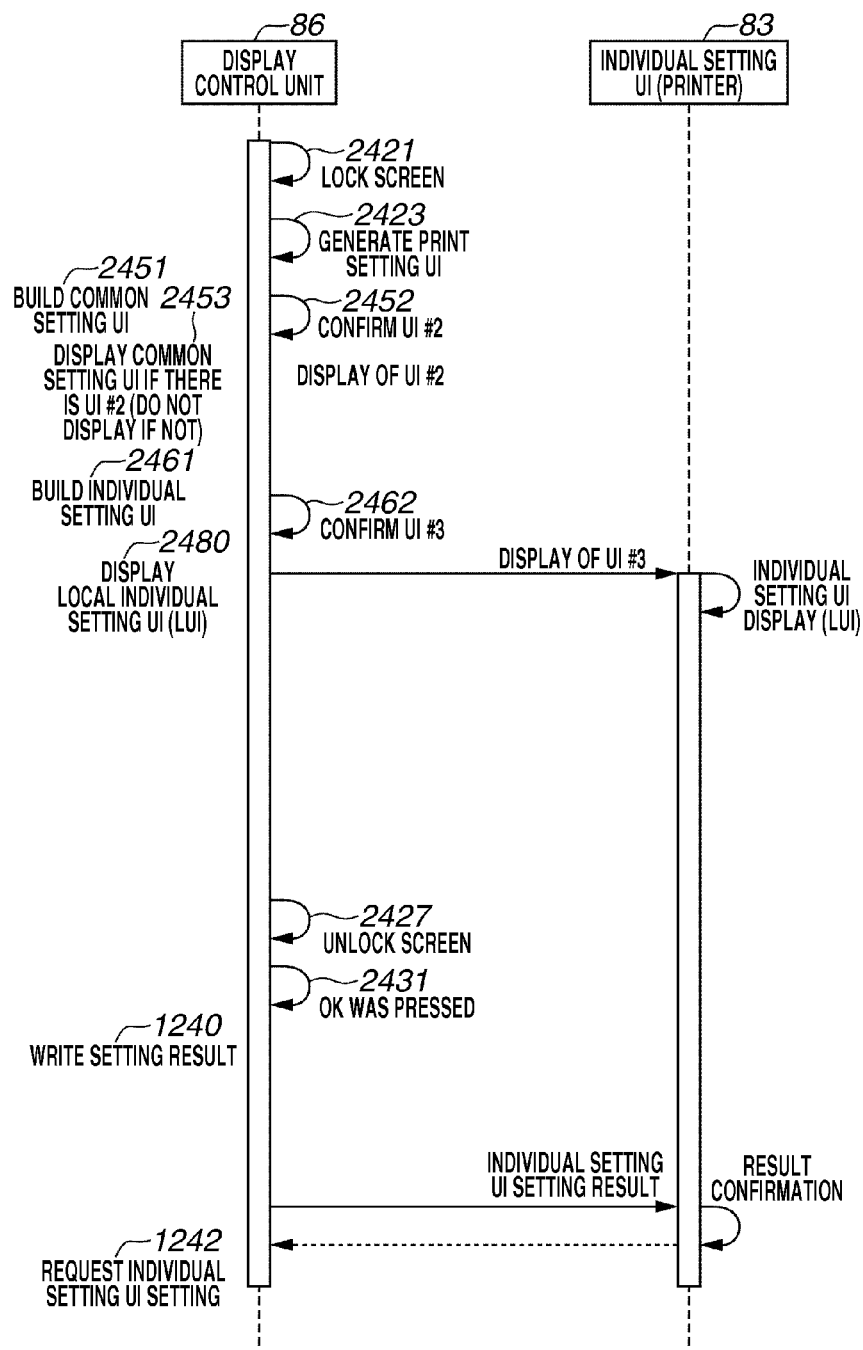
FIG. 19 is a sequence diagram of a printer print setting UI.

FIG. 19 is a sequence diagram of a printer print setting UI.

Basically, the sequence illustrates a flow in which the local individual setting UI 83 (printer 3) is displayed, but the common setting UI 82 (PC) is not displayed on the printer 3. The sequence illustrated in FIG. 19 corresponds to the sequence performed in the PC and printer of the print setting UI illustrated in FIG. 13 from which unnecessary sequence is omitted.

In step S2421, the display control unit 86 in the control unit 85 locks the screen. In step S2423, the display control unit 86 in the control unit 85 displays the print setting UI 81. From step S2451, the display control unit 86 in the control unit 85 starts building the common setting UI 82.

In step S2452, the display control unit 86 in the control unit 85 confirms the work data UI #2. In step S2453, since there is no UI #2, the display control unit 86 in the control unit 85 does not display the common setting UI 82. From step S2461, the display control unit 86 in the control unit 85 starts building the individual setting UI 83.

In step S2462, the display control unit 86 in the control unit 85 confirms the work data UI #3. If the UI #3 indicates local, in step S2480, the display control unit 86 in the control unit 85 displays the individual setting UI 83 (local). In step S2427, the display control unit 86 in the control unit 85 unlocks the display.

In step S2431, the OK button on the print setting UI 81 is pressed. From step S1240, the display control unit 86 in the control unit 85 writes the setting result. In step S1242, the display control unit 86 in the control unit 85 requests the setting of the individual setting UI 83.

Above, the display sequence of the print setting UI on the printer 3 has been described. Next, determination of the print setting data to be loaded by the printer 3 into the print setting UI will be described.

Figure 20:
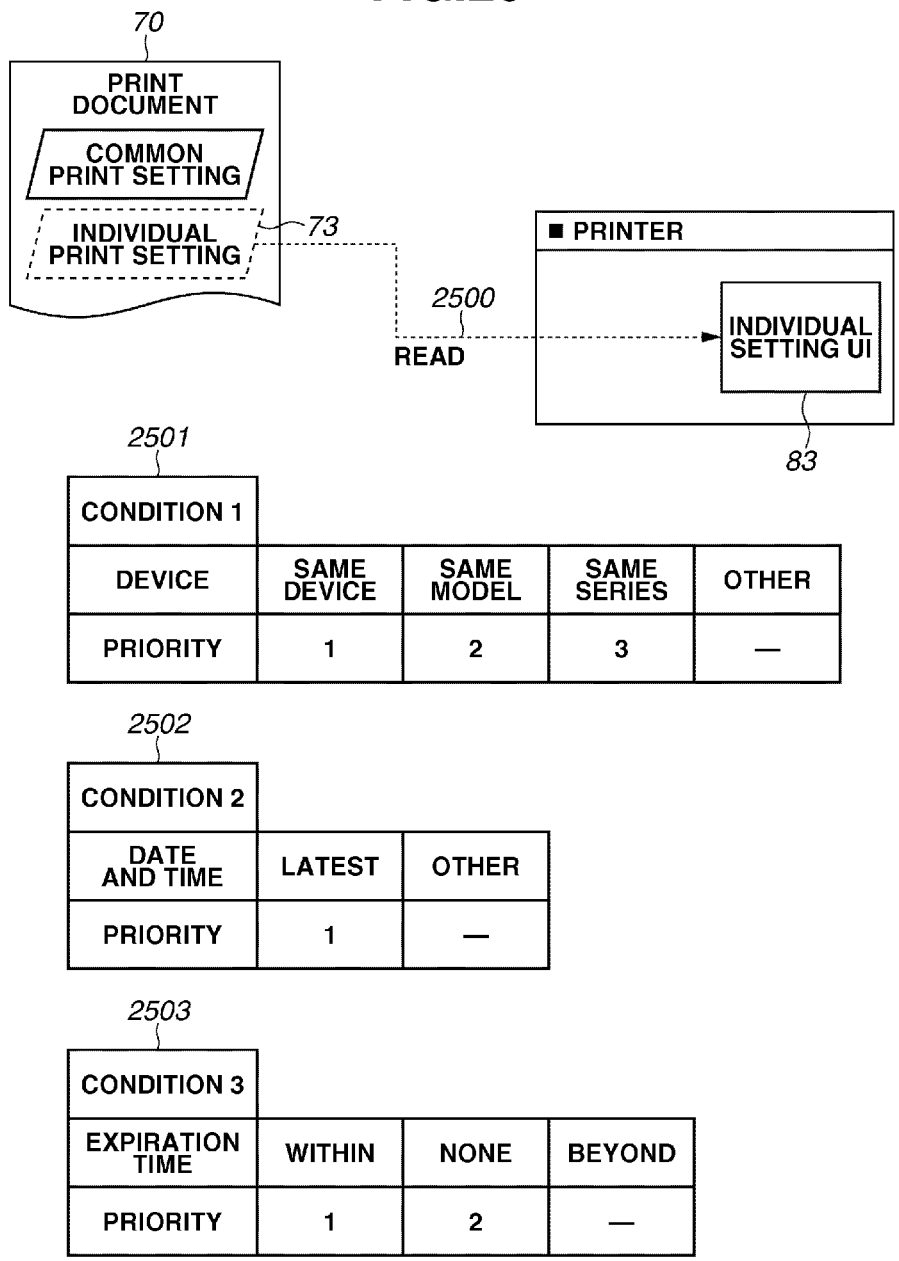
FIG. 20 illustrates an example of a read operation of the individual print setting data from a print document by the printer.

FIG. 20 illustrates an example of a read operation of the individual print setting data from the print document by the printer.

The printer 3 reads the individual print setting 73 in the print document 70 (2500), and displays the read individual print setting 73 on the individual setting UI 83 in the print setting UI. During the reading step (2500), the printer 3 determines the individual print setting that is appropriate for that device.

A determination condition 1 is illustrated in Table 2501. The printer 3 determines the device for which a print setting has been set based on the priority "same device>same model as this device>same series as this device>other". A determination condition 2 is illustrated in Table 2502. The printer 3 determines the date and time when the print setting was set based on the priority "latest>other". A determination condition 3 is illustrated in Table 2503. The printer 3 determines the expiration time of the print setting based on the priority "within expiration time>no expiration time>beyond expiration time". The printer 3 treats the priority among the determination conditions as "condition 1>condition 2>condition 3".

The printer 3 selects and reads the latest setting set by its own UI as the top priority setting based on these conditions and priorities. If it is difficult to determine the time, the printer 3 can use a serial value of the setting storage order instead. Above, determination of the individual print setting performed by the printer 3 during reading of the individual print setting has been described. A flowchart illustrating the reading of the print setting by the printer 3 and the determination processing will be described below.

Next, information that is added to the individual print setting 73 when the printer 3 stores the individual print setting will be described.

[The Printer Adds Information to be Used for Determination During Storage of the Individual Print Setting]

Figure 21:
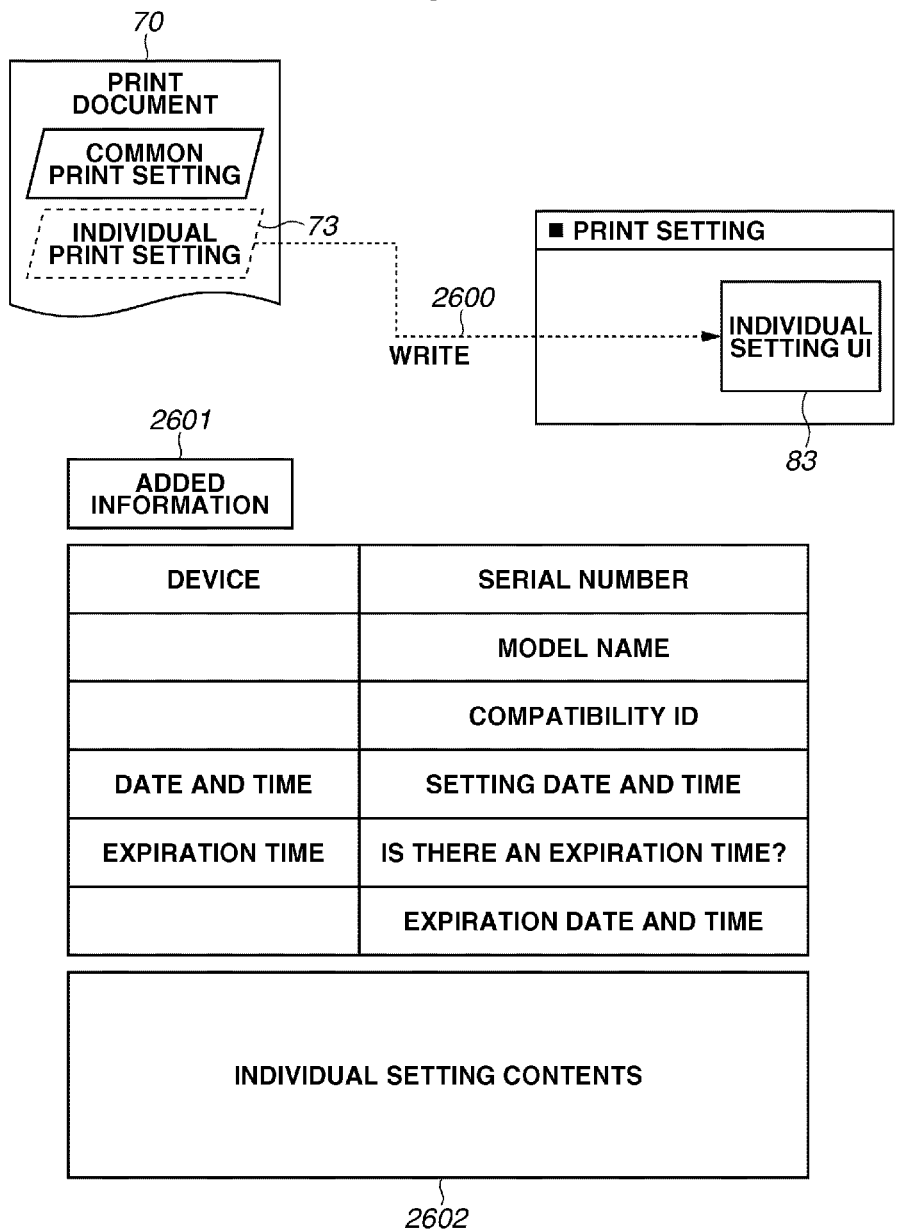
FIG. 21 illustrates an example of a storage operation of the individual print setting data in the print document by the printer.

FIG. 21 illustrates an example of a storage operation of individual print setting data in the print document by the printer. The printer 3 stores the individual setting UI 83 setting of the print setting UI in the individual print setting 73 in the print document 70 (2600). During this storage step (2600), the printer 3 adds information to the individual print setting. The added information is illustrated in Table 2601.

Device information includes the "serial number, model name, compatibility ID" of that device (same device). The serial number is a unique number for the device body. The model name is a device name or a model hardware ID. The compatibility ID is an ID that is shared among models. Time and date information is the "setting time and date". The printer 3 adds the information about the time and date when the print setting was set. If it is difficult to determine the time, the printer 3 can use a serial value of the setting storage order instead.

Expiration time information is whether there is an expiration time and if there is, the expiration date and time. This expiration time is mainly used so that, when a print document file has an expiration date, the same expiration date can be given to the print setting. The printer 3 can delete a print setting whose expiration time has passed. Further, the printer 3 can also use the expiration time for purposes such as suppressing an increase in file size.

The printer 3 describes the device for which the print setting has been set and that date and time information as added information, and stores this added information with the individual print setting contents 2602 in the print document 70. As described referring to FIG. 20, the printer 3 utilizes this added information when reading the individual print setting.

Above, information that is added by the printer 3 to the individual print setting has been described. A flowchart illustrating the storage of the print setting and the processing for adding the information performed by the printer 3 will be described below. Next, the building of the print setting data by the printer 3 will be described.

FIG. 22A illustrates a hierarchy example of setting data during printing by the printer.

The printer 3 forms the print output 78 from the print document 70, a rendering 71, the common print setting 72, and the individual print setting 73 (2700). Settings 2770 is an example of a hierarchy structure of the setting data in the printer 3 relating to the formation of the print output 78. The printer 3 setting includes a factory shipping setting 2771 and a current main body setting 2772. The factory shipping setting 2771 is the default value for the printer 3 setting.

The main body setting 2772 is a setting that is not limited to the printing necessary for the operation of the printer 3, or is a setting that influences the overall printing. For example, the main body setting 2772 may include a network setting.

The setting for printing by the printer 3 has a structure in which the common print setting 72 and the individual print setting 73 for a print job are applied to the factory shipping setting 2771 and the main body setting 2772. The setting for the print job is formed by preferentially merging the common print setting 72 with the individual print setting 73.

FIG. 22B is a chart illustrating building of setting data during printing by the printer 3. When the print document 70 is input, the control unit 85 extracts the rendering, the common setting, and the individual setting from the print document 70 (2710). Then, the control unit 85 calls the data management unit 87 in the control unit 85 in order to build the print setting data.

From step S2720, the data management unit 87 starts flow B (Build). In step S2722, the data management unit 87 selects the common setting. In step S2723, the data management unit 87 selects the individual setting. In step S2730, the data management unit 87 loads the factory shipping value.

In step S2731, the data management unit 87 loads the main body setting. In step S2740, the data management unit 87 merges the common setting and the individual setting. In step S2741, the data management unit 87 merges the factory shipping setting, the main body setting, the common setting, and the individual setting.

In step S2724, the data management unit 87 transfers the built print setting. In step S2750, the data management unit 87 finishes flow B.

The control unit 85 combines the print setting transferred from the data management unit 87 and the rendering, executes printing (2760), and outputs the print output 78. Above, building of the setting data during printing by the printer 3 has been described.

To summarize the above description of the printer, a setting example when the printer is operating will now be described.

Figure 23A:
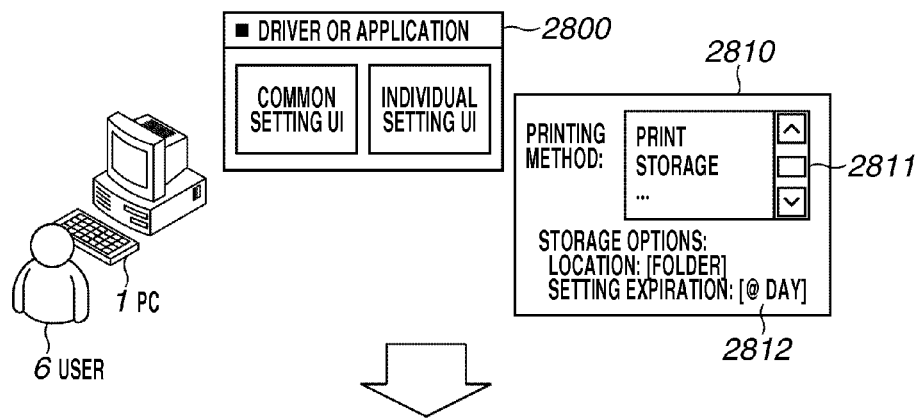
FIG. 23A illustrates an example of setting the individual print setting from the PC to the printer for storage or a print operation.

FIG. 23A illustrates an example of setting the individual print setting from the PC to the printer for storage or a print operation.

The user 6 sets the print setting with a print setting UI 2800 on the PC 1. A dialog 2810 waits for a switching operation selection (2811) in the "printing method" between "print" and "storage". Further, the user 6 can specify "folder" or "setting expiration time" as a "storage option". The print document, which includes this setting in the dialog 2810, is then sent from the PC 1 to the printer 3.

Figure 23B:
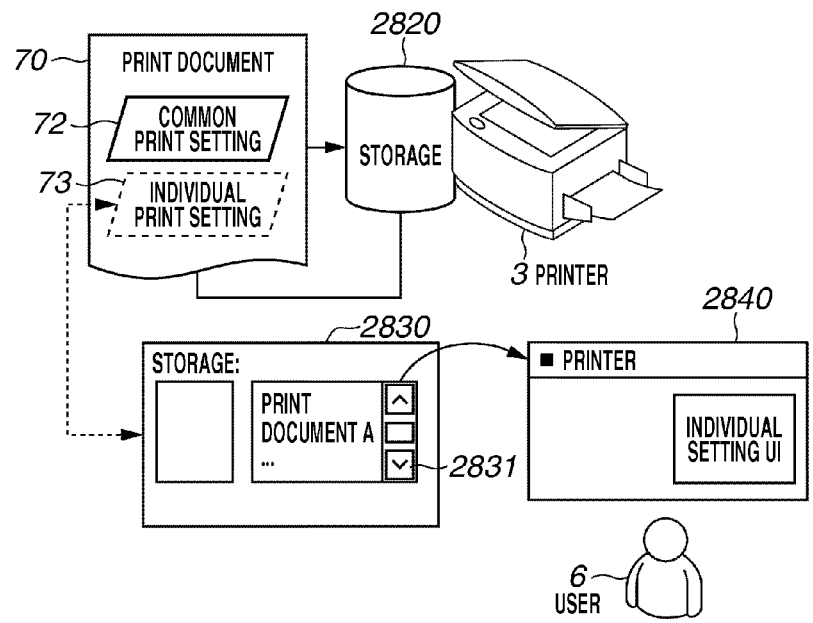
FIG. 23B illustrates an example of the printer setting an individual print setting during a storage operation.

FIG. 23B illustrates an example of the printer setting an individual print setting during a storage operation.

The print document 70 is in a storage 2820 in the printer 3. A printer 3 storage screen 2830 includes a file list 2831. When the user 6 wishes to refer to or change the print setting, the user 6 selects the print document and opens a print setting UI 2840. The print setting UI 2840 reads and displays the individual print setting 73 in the print document 70. Then, the setting that has been set by the user 6 on the print setting UI 2840 is stored in the individual print setting 73 of the print document 70.

Figure 23C:
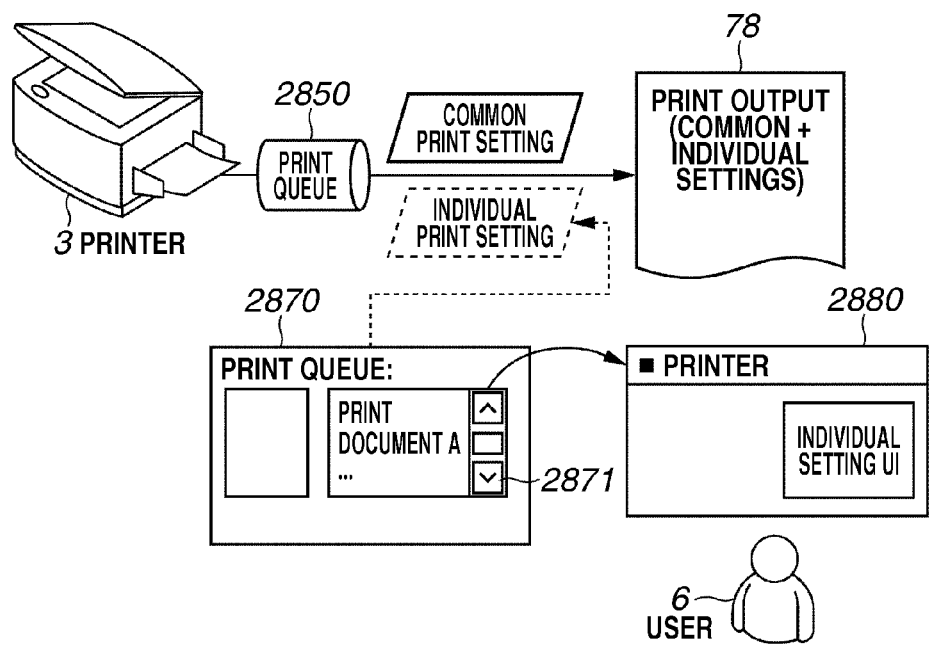
FIG. 23C illustrates an example of the printer setting an individual print setting during a print operation.

FIG. 23C illustrates an example of the printer setting an individual print setting during a print operation.

The print document 70 is in a print queue 2850 in the printer 3. A printer 3 print queue screen 2870 includes a file list 2871. When the user 6 wishes to refer to or change the print setting, the user 6 selects the print document and opens a print setting UI 2880.

The print setting UI 2880 reads and displays the individual print setting 73 that is arranged in a memory. Then, the setting that was set by the user 6 on the print setting UI 2840 updates the individual print setting 73 in the memory, and is reflected as the print setting in the print output 78.

A flowchart illustrating the print setting processing performed by the printer 3 during storage or the print operation will be described below.

In FIG. 23C, during the print operation, an example has been described of a method for changing the individual print setting 73 arranged on a separate storage medium by reading from the print document. In other words, the printer 3 can update the print setting even by a method in which the individual print setting 73 is not restored in the print document 70. As long as the method arranges the print document 70 in a print queue during printing, the processing is the same as that performed in the above-described storage operation.

FIG. 24 is a flowchart illustrating reading of the individual print setting by the printer control unit.

From step S3000, flow R1 (Read 1) starts. From step S3001, the control unit 85 starts reading the setting from the print document 70. From step S3010, the control unit 85 starts reading of the common setting. In step S3011, the control unit 85 determines whether there is a common setting in the print document 70. If there is a common setting (YES in step S3011), the processing proceeds to step S3012. If there is not a common setting (NO in step S3011), the processing proceeds to step S3013.

In step S3012, the control unit 85 loads the common setting from the print document 70. In step S3013, the control unit 85 loads the default common setting for the printer. In step S3014, the control unit 85 determines whether there is an individual setting in the print document 70. If there is an individual setting (YES in step S3014), the processing proceeds to step S3020. If there is not an individual setting (NO in step S3014), the processing proceeds to step S3045.

From step S3020, the control unit 85 starts reading of the individual print setting 73. In step S3021, the control unit 85 calls the flow R2 to be performed by the data management unit 87. In step S3070, the control unit 85 determines whether there is an individual setting that is employed by the data management unit 87. If there is an employed individual setting (YES in step S3070), the processing proceeds to step S3080. If there is not an employed individual setting (NO in step S3070), the processing proceeds to step S3045.

In step S3045, the control unit 85 loads the current setting value of the printer 3. In step S3080, the control unit 85 loads the individual print setting in the print document 70. In step S3081, the control unit 85 performs BLOB encoding on the individual print main setting. In step S3090, the control unit 85 finishes flow R1.

Above, a flowchart of reading of the individual print setting by the printer 3 has been described. FIGS. 14 and 24 are the same in terms of their processing. However, a feature of FIG. 24 is the flow for referring to the individual print setting data by the control unit 85 in the printer 3. Next, a flowchart of this feature, specifically, determination of the applied individual print setting by the printer 3, will be described.

Figure 25:
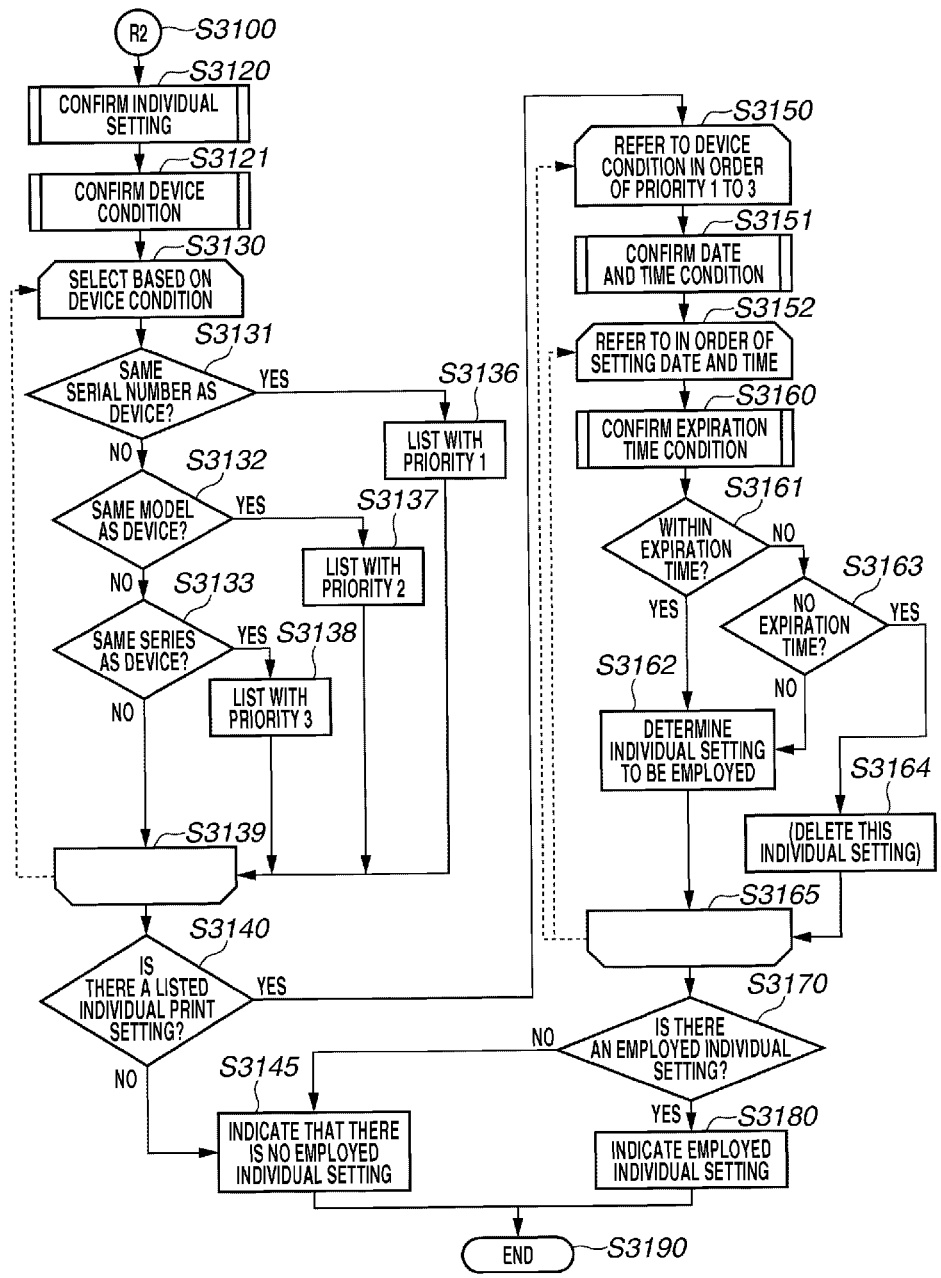
FIG. 25 is a flowchart executed when a data management unit 87 in the printer determines the individual print setting data.

FIG. 25 is a flowchart to be executed when the data management unit 87 in the printer determines the individual print setting data.

The data management unit 87 in the printer 3 determines the individual print setting that is appropriate for that device. The data management unit 87 in the printer 3 determines the device condition and the date and time condition, and selects the latest setting performed by that device as the top priority setting.

From step S3100, flow R2 (Read 2) starts. From step S3120, the data management unit 87 starts confirmation of the individual print setting. From step S3121, the data management unit 87 starts confirmation of the device conditions in the added information.

From step S3130, the data management unit 87 selects the individual print setting based on the device condition. In step S3131, the data management unit 87 confirms whether the serial number is the same as that device. If the serial number is the same as that device (YES in step S3131), the processing proceeds to step S3136. In step S3136, the data management unit 87 lists that individual setting as priority 1. If the serial number is not the same as that device (NO in step S3131), the processing proceeds to step S3132.

In step S3132, the data management unit 87 confirms whether the model is the same as that device. If the model is the same as that device (YES in step S3132), the processing proceeds to step S3137. In step S3137, the data management unit 87 lists that individual setting as priority 2. If the model is not the same as that device (NO in step S3132), the processing proceeds to step S3133.

In step S3133, the data management unit 87 confirms whether the series is the same as that device. If the series is the same as that device (YES in step S3133), the processing proceeds to step S3138. In step S3138, the data management unit 87 lists that individual setting as priority 3. If the series is not the same as that device (NO in step S3133), the processing proceeds to step S3139. In step S3139, the data management unit 87 leaves the individual print setting constant loop of the print document 70.

In step S3140, the data management unit 87 confirms whether there is a listed individual print setting. If there is a listed individual print setting (YES in step S3140), the processing proceeds to step S3150. If there is a not listed individual print setting (NO in step S3140), the processing proceeds to step S3145. From step S1350, the data management unit 87 starts referring to the listed individual print setting in order of priority 1 to 3.

From step S3151, the data management unit 87 starts confirmation of the date and time condition. In step S3152, the data management unit 87 refers to the individual print setting in order of newest setting date and time. From step S3160, the data management unit 87 starts confirmation of the expiration time condition.

In step S3161, the data management unit 87 confirms whether the date and time is within the expiration time. If it is within the expiration time (YES in step S3161), the processing proceeds to step S3162. If the date and time is not within the expiration time (NO in step S3161), the processing proceeds to step S3163. In step S3162, the data management unit 87 determines the individual print setting to be employed. The processing then leaves the loop of step S3165.

In step S3163, the data management unit 87 confirms whether there is no expiration time. If there is no expiration time (NO in step S3163), the processing proceeds to step S3162. If there is an expiration time (YES in step S3163), the processing proceeds to step S3164. In step S3164, the data management unit 87 deletes this individual print setting. In step S3165, the data management unit 87 leaves the loop of the individual print setting listed number.

In step S3170, the data management unit 87 confirms whether the there is individual setting determined to be employed. If there is the individual setting determined to be employed (YES in step S3170), the processing proceeds to step S3180. If there is not the individual setting determined to be employed (NO in step S3170, the processing proceeds to step S3145.

In step S3145, the data management unit 87 indicates that there is not the employed individual print setting. In step S3180, the data management unit 87 indicates the employed individual setting. In step S3190, the data management unit 87 finishes flow R2.

Above, a flowchart illustrating determination of the individual print setting data by the printer 3 has been described.

Next, a flowchart illustrating storage of the individual print setting by the printer 3 will be described.

Figure 26:
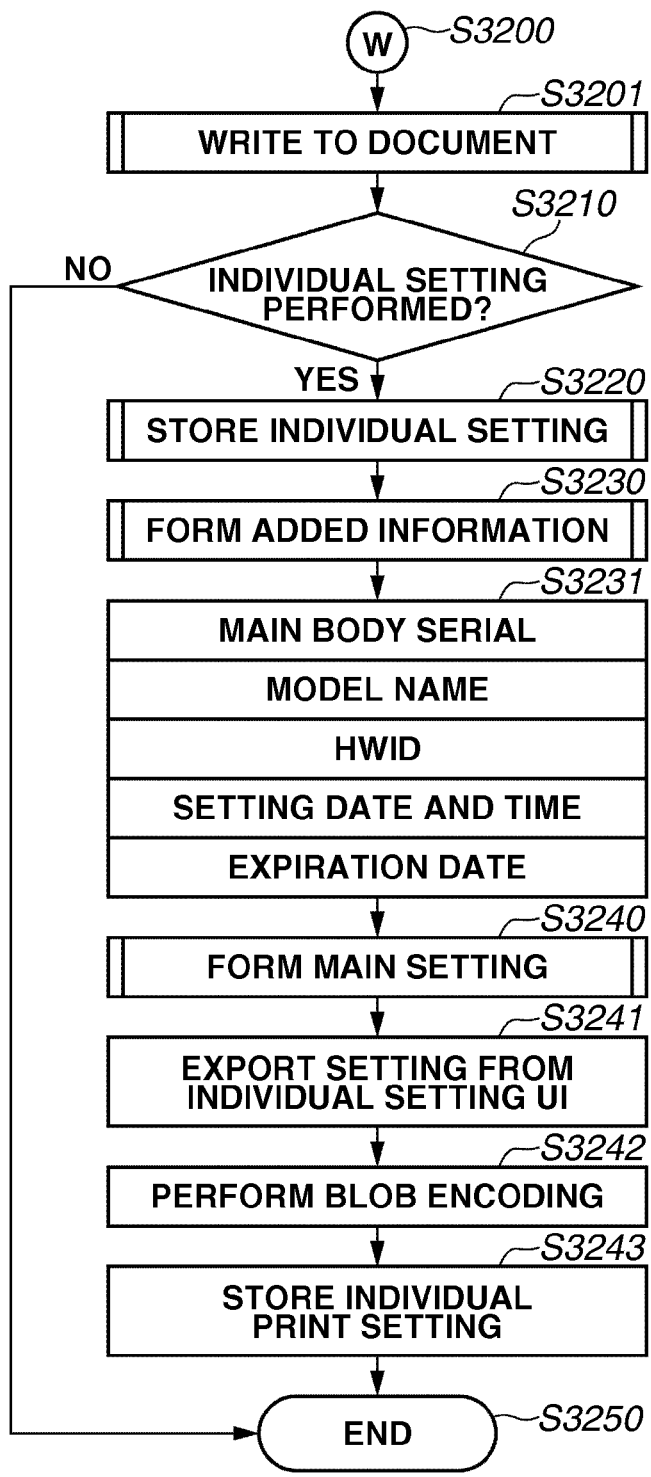
FIG. 26 is a flowchart illustrating storage of the individual print setting by the printer control unit.

FIG. 26 is a flowchart illustrating storage of the individual print setting by the printer control unit.

During storage, the control unit 85 in the printer 3 confers the condition to be utilized during reading of the individual print setting as information. The control unit 85 in the printer 3 describes information about the device for which the print setting is set and the date and time, and stores this information along with the individual print setting.

From step S3200, the flow W (Write) starts. From step S3201, the control unit 85 starts setting storage into the print document 70. In step S3210, the control unit 85 confirms whether the individual print setting has been performed. If the individual print setting has been performed (YES in step S3210), the processing proceeds to step S3220. If the individual print setting has not been performed (NO in step S3210), the processing proceeds to step S3250.

From step S3220, the control unit 85 starts storage of the individual print setting. From step S3230, the control unit 85 starts formation of the added information. In step S3231, the control unit 85 adds the main body serial, the model name, a hardware ID (HWID), the setting date and time, and the expiration date. From step S3240, the control unit 85 starts formation of the individual print main setting.

In step S3241, the control unit 85 exports the setting from the individual setting UI. In step S3242, the control unit 85 performs BLOB encoding on the individual print main setting. In step S3243, the control unit 85 stores the individual print setting in the print document 70. In step S3250, the control unit 85 finishes flow W.

Above, a flowchart illustrating storage of the individual print setting by the printer 3 has been described. Next, the flow of a print setting operation by the printer 3 will be described.

Figure 27:
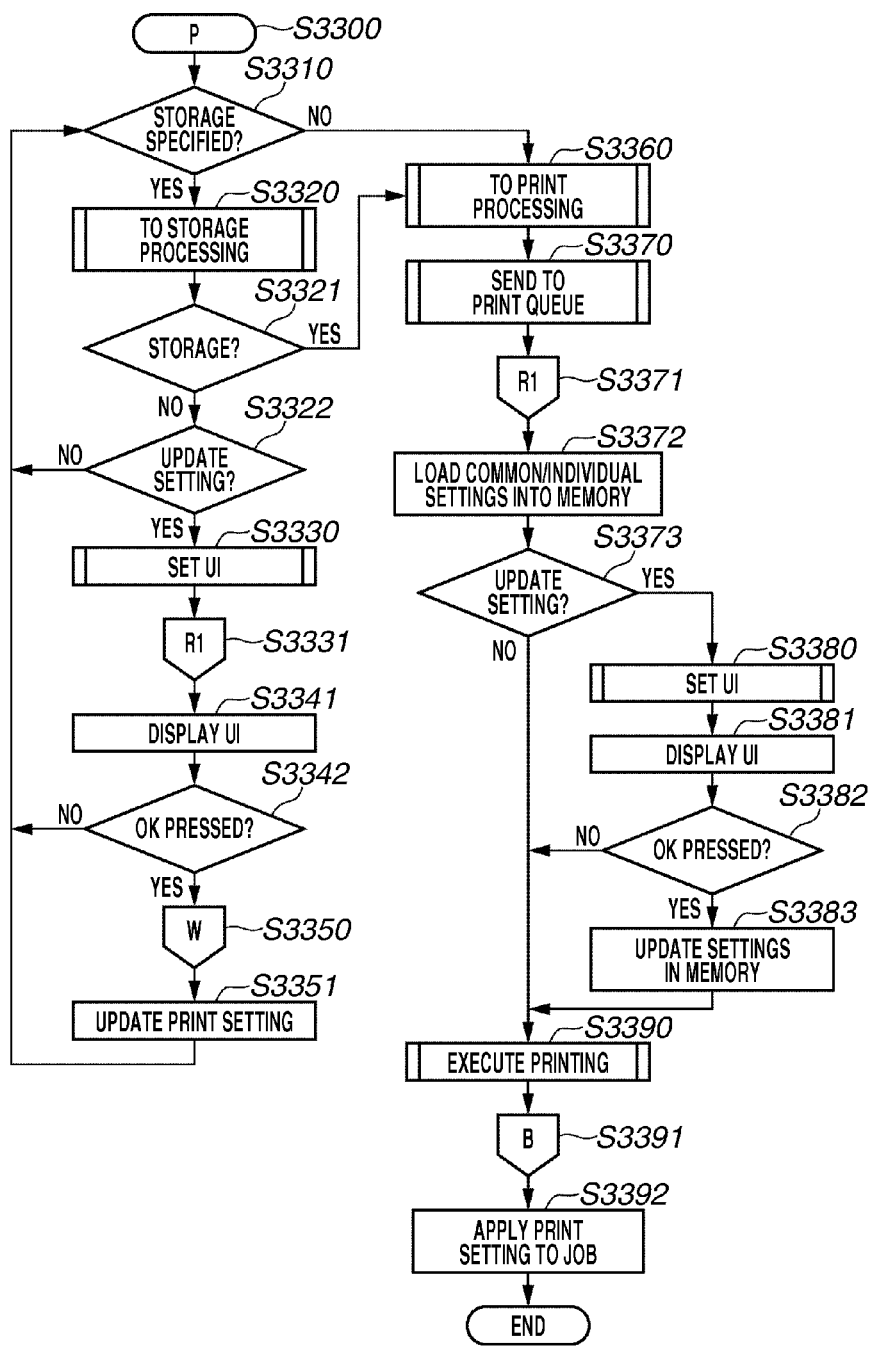
FIG. 27 is a print setting flowchart executed during a storage and print operation by the printer control unit.

FIG. 27 is a print setting flowchart executed during a storage and print operation by the printer control unit.

The control unit 85 in printer 3 reads the above individual print setting, and calls a storage flow. When the print setting is updated when storing thereof in the printer 3, the print setting is written back and the print document is updated. During the print operation, even if the print setting is updated, the setting in the memory is updated but the document is not updated.

From step S3300, a flow P (Print) starts. In step S3310, the control unit 85 confirms whether "storage" is specified. If "storage" is specified (YES in step S3310), the processing proceeds to step S3320. If "storage" is not specified (NO in step S3310), the processing proceeds to step S3360.

From step S3320, the control unit 85 starts storage processing. In step S3321, the control unit 85 confirms whether there is a storage. If there is no storage (NO in step S3321), the processing proceeds to step S3360. If there is a storage (YES in step S3321), the processing proceeds to step S3322.

In step S3322, the control unit 85 confirms whether there is a setting update instruction in the storage. If there is an instruction (YES in step S3322), the processing proceeds to step S3330. If there is no instruction (NO in step S3322), the processing returns to step S3310.

From step S3330, the control unit 85 starts the UI setting in the storage. In step S3331, the control unit 85 calls the flow R1. In step S3341, the control unit 85 displays the setting UI set based on the setting read from the print document 70.

In step S3342, the control unit 85 confirms whether the OK button on the setting UI is pressed. If the OK button is pressed (YES in step S3342), the processing proceeds to step S3350. If the OK button is not pressed (NO in step S3342), the processing returns to step S3310. In step S3350, the control unit 85 calls the flow W. In step S3351, the control unit 85 updates the print document 70.

From step S3360, the control unit 85 starts print processing. From step S3370, the control unit 85 sends the print document 70 to the print queue. In step S3371, the control unit 85 calls the flow R1. In step S3372, the control unit 85 places the common print setting and the individual print setting in the memory.

In step S3373, the control unit 85 confirms whether there is a setting update instruction in the print queue. If there is an instruction (YES in step S3373), the processing proceeds to step S3380. If there is no print instruction (NO in step S3373), the processing proceeds to step S3390. From step S3380, the control unit 85 starts the UI setting in the print processing.

In step S3381, the control unit 85 displays the print setting based on the setting in the memory. In step S3382, the control unit 85 confirms whether the OK button on the setting UI is pressed. If the OK button is pressed (YES in step S3382), the processing proceeds to step S3383. If the OK button is not pressed (NO in step S3382), the processing proceeds to step S3390.

In step S3383, the control unit 85 updates the setting in the memory. From step S3390, the control unit 85 starts print execution. In step S3391, the control unit 85 calls the flow B. In step S3392, the control unit 85 applies the print setting to the job.

Above, a flowchart illustrating print setting during the storage and print operation by the control unit 85 in the printer 3 was described.

According to the present exemplary embodiment, the printer 3 extracts the print setting from the print document so that the extracted print setting can be displayed and edited on two UIs (RUI and LUI). Further, according to the present exemplary embodiment, the printer 3 determines the print setting that should be applied based on a print setting edited on the UI in the respective devices.

In addition, the present exemplary embodiment has the following advantageous effects relating to the print setting which improve operability. First, the user can set the print setting on several devices, such as the printer 3. Further, the printer 3 can determine the applied print setting, and display that print setting on the printer 3 UI. Moreover, the user can execute printing by referring to the UI display on the printer 3 so that only the setting for the required locations is changed.

FIG. 28A illustrates a product configuration to which the exemplary embodiment can be easily applied.

The configuration of the present exemplary embodiment is highly compatible with a direct print system because the printing is performed in a WAN environment. As illustrated in FIG. 28A, direct print is a system in which the printer 3 receives the print document 70 and performs print output 78.

As the print document 70, an XPS document or a document having the same specification is highly compatible. This is because XPS documents include rendering resources and the print setting, and the document contents have a fixed printing appearance.

Document contents and printer systems that need to substantially change the rendering main body based on the print setting are difficult to operate in an environment in which the printer cannot be specified. For a remote printer UI, a UI that utilizes a web browser as the operating environment is suitable.

An external UI in the printer 3 has especially good compatibility if it is a screen or a program executed on a web browser. Having a UI on the PC 1 that was downloaded during display perform the processing allows the load on the printer 3 to be reduced.

Regarding the software (SW), a versatile printer driver or a web-based application have high compatibility. This is because these types of software are frequently used to perform print processing targeted at a standard print setting in a WAN environment.

A versatile printer driver can have the same configuration as the present exemplary embodiment by combining the UI for that versatile driver with a printer UI (remote). In the present system, a difference (1701) for each printer corresponds to the individual setting UI 83 (printer) and the printer 3 itself. Therefore, if a web-based application is compatible with the individual print setting, it can support a plurality of devices.

FIG. 28B illustrates a device support life cycle of the present system.

As described above, the PC software (SW) in the present system is responsible for the common setting, and does not access the contents of the individual setting, which depends on the printer. This division of responsibilities eliminates the need for software to be developed and distributed for each release of printer (1720).

In a conventional system, the software that is distributed at present 1712 handles past 1711 printers A and B 1731 and the present 1712 printer C 1732. However, the software cannot handle a future 1713 printer D 1733, which has an unknown specification.

A conventional system separately releases software or updates software three times, at the past 1711, the present 1712, and the future 1713. However, with the present system, if the future 1713 printer S1733 is subsequently arranged, the system can be utilized.

When a device is connected, printing can be performed based on the range of the common print setting. Further, there is no need to reinstall software, and the functions of a future device can be fully utilized. When building a print service by arranging software over a wide range, like a WAN, locatability and immediacy are important. Above, the characteristics of the present system has been described in order to more fully illustrate the advantageous effects of the present system.

The arrangement and the format of the configuration of the above-described print setting unit 80 can be changed. For example, a part of the software configuration or data may be arranged on the server or distributed to another location.

Further, the present invention can also be realized by supplying software (a program) for realizing the functions of the above exemplary embodiment to a system or an apparatus via a network or via various storage media, and having a computer (a CPU or a micro processing unit (MPU)) of the system or apparatus read and execute the program.

According to the above exemplary embodiment, the user is provided with a certain level of print setting operations even in an environment in which the printer is undetermined. In addition, when output printer is confirmed, the user can fully utilize the functions of the printer. Moreover, according to the above exemplary embodiment, the print setting can be set even in a non-PC environment or in a direct print path.

Further, according to the above exemplary embodiment, the print setting in the document data can be edited by a remote UI in a device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-257213 filed Nov. 17, 2010 and No. 2011-147414 filed Jul. 1, 2011, which are hereby incorporated by reference herein in their entirety.

What is claimed is:

1. An information processing apparatus comprising a display control unit configured to perform control so that a common setting screen through which a common setting which does not depend on an image processing apparatus model can be set, and an individual setting screen through which an individual setting which depends on an image processing apparatus model are displayed on a print setting screen can be set,
wherein the display of the common setting screen and the individual setting screen on the print setting screen depend upon usage location of the display control unit such that when the display control unit is used at a server location, only the common setting screen is displayed on the print setting screen, when the display control unit is used at a personal computer location, both the common setting screen and the individual setting screen are displayed on the print setting screen, and when the display control unit is used at a printer location, only the individual setting screen is displayed on the print setting screen.

2. The information processing apparatus according to claim 1, wherein the display control unit is configured to, when data indicating the common setting screen is in an environment variable, perform control so that the common setting screen is displayed on the print setting screen, and when data indicating that the common setting screen is not in an environment variable, perform control so that the common setting screen is not displayed on the print setting screen.

3. The information processing apparatus according to claim 1, wherein the display control unit is configured to, when communication is possible with an image processing apparatus, perform control so that the individual setting screen of the image processing apparatus is displayed on the print setting screen, and when communication is not possible with an image processing apparatus, perform control so that the individual setting screen is not displayed on the print setting screen.

4. The information processing apparatus according to claim 3, wherein the display control unit is configured to,
when data indicating a remote individual setting screen is in an environment variable and communication is possible with an image processing apparatus, perform control so that the individual setting screen of the image processing apparatus is displayed on the print setting screen,
when data indicating a remote individual setting screen is in an environment variable and communication is not possible with an image processing apparatus, perform control so that the individual setting screen is not displayed on the print setting screen, and
when data indicating a local individual setting screen is in an environment variable, perform control so that a local individual setting screen is displayed on the print setting screen.

5. An information processing method executed by an information processing apparatus, the method comprising:
displaying a print setting screen;
displaying on the print setting screen a common setting screen through which a common setting that does not depend on an image processing apparatus model can be set; and
displaying on the print setting screen an individual setting screen through which an individual setting that depends on an image processing apparatus model can be set,
wherein the display of the common setting screen and the individual setting screen on the print setting screen depend upon usage location of the display control unit such that when the display control unit is used at a server location, only the common setting screen is displayed on the print setting screen, when the display control unit is used at a personal computer location, both the common setting screen and the individual setting screen are displayed on the print setting screen, and when the display control unit is used at a printer location, only the individual setting screen is displayed on the print setting screen.

6. A non-transitory computer-readable storage medium storing a program that causes a computer to execute a method, the method comprising:
displaying a print setting screen;
displaying on the print setting screen a common setting screen through which a common setting that does not depend on an image processing apparatus model can be set; and
displaying on the print setting screen an individual setting screen through which an individual setting that depends on an image processing apparatus model can be set,
wherein the display of the common setting screen and the individual setting screen on the print setting screen depend upon usage location of the display control unit such that when the display control unit is used at a server location, only the common setting screen is displayed on the print setting screen, when the display control unit is used at a personal computer location, both the common setting screen and the individual setting screen are displayed on the print setting screen, and when the display control unit is used at a printer location, only the individual setting screen is displayed on the print setting screen.

7. An information processing apparatus configured to send a print document to an image processing apparatus, the information processing apparatus comprising:
a display unit configured to display a setting screen that includes a common print setting screen of the information processing apparatus and an individual print setting screen of the image processing apparatus;
a setting unit configured to set in the print document a common print setting and an individual print setting set through the setting screen that includes the common print setting screen and the individual print setting screen displayed on the display unit; and
a sending unit configured to send to the image processing apparatus the print document in which the common print setting and the individual print setting are set by the setting unit, wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the setting screen.

8. An information processing method to be executed by an information processing apparatus configured to send a print document to an image processing apparatus, the method comprising:
displaying a setting screen that includes a common print setting screen of the information processing apparatus and an individual print setting screen of the image processing apparatus;
setting in the print document a common print setting and an individual print setting set through the displayed setting screen that includes the common print setting screen and the individual print setting screen displayed; and
sending to the image processing apparatus the print document in which the common print setting and the set individual print setting,
wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the setting screen.

9. A non-transitory computer-readable storage medium storing a program that causes a computer configured to send a print document to an image processing apparatus to execute a method, the method comprising:
displaying a setting screen that includes a common print setting screen of the information processing apparatus and an individual print setting screen of the image processing apparatus;
setting in the print document a common print setting and an individual print setting set through the displayed setting screen that includes the common print setting screen and the individual print setting screen displayed; and
sending to the image processing apparatus the print document in which the common print setting and the individual print setting have been set,
wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the setting screen.

10. An image processing apparatus configured to print a print document sent from an information processing apparatus, the image processing apparatus comprising:
a receiving unit configured to receive from the information processing apparatus a print document in which an individual print setting set through a setting screen that includes an individual print setting screen of the image processing apparatus is set;
a display unit configured to read the individual print setting set in the print document received by the receiving unit and display a setting screen that reflects the individual print setting;
a setting unit configured to set in the print document the individual print setting set through the setting screen displayed by the display unit; and
a print control unit configured to perform control so that the print document is printed based on the individual print setting set in the print document,
wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the setting screen.

11. An image processing method to be executed by an image processing apparatus that is configured to print a print document sent from an information processing apparatus, the method comprising:
receiving from the information processing apparatus a print document in which an individual print setting set through a setting screen that includes an individual print setting screen of the image processing apparatus, is set;
reading the individual print setting set in the received print document, and displaying a setting screen that reflects the individual print setting;
setting in the print document the individual print setting set through the displayed setting screen; and
performing control so that the print document is printed based on the individual print setting set in the print document,
wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the setting screen.

12. A non-transitory computer-readable storage medium storing a program that causes a computer configured to print a print document sent from an information processing apparatus to execute a method, the method comprising:
receiving from the information processing apparatus a print document in which an individual print setting set through a setting screen that includes an individual print setting screen of the image processing apparatus, is set;
reading the individual print setting set in the received print document, and displaying a setting screen that reflects the individual print setting;
setting in the print document the individual print setting set through the displayed setting screen; and performing control so that the print document is printed based on the individual print setting set in the print document, wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the print setting screen.

13. A system comprising an information processing apparatus and an image processing apparatus, wherein the information processing apparatus comprises:

a display unit configured to display a setting screen that includes an individual print setting screen of the image processing apparatus;

a setting unit configured to set in the print document an individual print setting set through the setting screen that includes the individual print setting screen displayed on the display unit; and a sending unit configured to send to the image processing apparatus the print document in which the individual print setting is set by the setting unit, and wherein the image processing apparatus comprises:

a receiving unit configured to receive from the information processing apparatus a print document in which an individual print setting set through a setting screen that includes an individual print setting screen of the image processing apparatus is set;

a display unit configured to read the individual print setting set in the print document received by the receiving unit and display a setting screen that reflects the individual print setting;

a setting unit configured to set in the print document the individual print setting set through the setting screen displayed by the display unit; and a print control unit configured to perform control so that the print document is printed based on the individual print setting set in the print document, wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the setting screen.

14. An image processing method in a system that comprises an information processing apparatus and an image processing apparatus, wherein the method performed by the information processing apparatus comprising:

displaying a setting screen that includes an individual print setting screen of the image processing apparatus;

setting in the print document an individual print setting set through the setting screen that includes the individual print setting screen displayed on the display unit;

sending to the image processing apparatus the print document in which the individual print setting was set by the setting unit, and wherein the method performed by the image processing apparatus comprising:

receiving from the information processing apparatus a print document in which an individual print setting set through a setting screen that includes an individual print setting screen of the image processing apparatus is set;

reading the individual print setting set in the print document received by the receiving unit, and displaying a setting screen that reflects the individual print setting;

setting in the print document the individual print setting set through the setting screen displayed by the display unit; and performing control so that the print document is printed based on the individual print setting set in the print document, wherein the display of the common setting screen and the individual setting screen on the setting screen depend upon usage location of the display control unit such that when the display control unit is used at a server location, only the common setting screen is displayed on the setting screen, when the display control unit is used at a personal computer location, both the common setting screen and the individual setting screen are displayed on the setting screen, and when the display control unit is used at a printer location, only the individual setting screen is displayed on the print setting screen.

\* \* \* \* \*